(12) United States Patent
Harada

(10) Patent No.: US 8,009,253 B2
(45) Date of Patent: Aug. 30, 2011

(54) ELECTRO-OPTICAL DEVICE HAVING INSULATING LAYER WITH VARYING THICKNESS IN THE REFLECTION AND TRANSMISSION DISPLAYS

(75) Inventor: Norihito Harada, Azumino (JP)

(73) Assignee: Sony Corporation, Tokyo (JP)

( * ) Notice: Subject to any disclaimer, the term of this patent is extended or adjusted under 35 U.S.C. 154(b) by 173 days.

(21) Appl. No.: 12/379,035

(22) Filed: Feb. 11, 2009

(65) Prior Publication Data

US 2009/0153787 A1 Jun. 18, 2009

Related U.S. Application Data

(63) Continuation of application No. 11/452,361, filed on Jun. 14, 2006, now abandoned.

(30) Foreign Application Priority Data

Jun. 22, 2005 (JP) ................................. 2005-181542
Mar. 29, 2006 (JP) ................................. 2006-090367

(51) Int. Cl.
  *G02F 1/1335* (2006.01)
  *G02F 1/1339* (2006.01)
(52) U.S. Cl. ......... 349/114; 349/113; 349/153; 349/190
(58) Field of Classification Search .......... 349/113–114, 349/153, 190
  See application file for complete search history.

(56) References Cited

U.S. PATENT DOCUMENTS

| 6,424,401 | B1 * | 7/2002 | Kang et al. |
| 6,738,125 | B2 * | 5/2004 | Yamada et al. |
| 6,765,637 | B2 * | 7/2004 | Takenaka ....................... 349/113 |
| 6,919,948 | B2 * | 7/2005 | Kaneko et al. ................ 349/152 |
| 6,970,217 | B2 * | 11/2005 | Lim et al. |
| 7,126,662 | B2 * | 10/2006 | Choi et al. |
| 7,619,258 | B2 * | 11/2009 | Tsuchiya et al. ................ 257/83 |
| 2002/0033917 | A1 * | 3/2002 | Hoshino |
| 2002/0044241 | A1 * | 4/2002 | Matsuo |

FOREIGN PATENT DOCUMENTS

| JP | A-03-085732 | * | 4/1991 |
| JP | A-07-020472 | * | 1/1995 |
| JP | A-2001-117108 | * | 4/2001 |
| JP | A-2001-249328 | * | 9/2001 |
| JP | A-2002-229033 | * | 8/2002 |
| JP | A-2002-268054 | * | 9/2002 |
| JP | A 2003-262856 | * | 9/2003 |
| JP | A 2004-325822 | * | 11/2004 |
| JP | A 2004-354507 | * | 12/2004 |
| JP | A-2004-361623 | * | 12/2004 |
| JP | A-2005-128154 | * | 5/2005 |
| KR | A-2001-0017399 | * | 3/2001 |
| KR | A-2004-0061989 | * | 7/2004 |

* cited by examiner

*Primary Examiner* — Hoan C Nguyen
(74) *Attorney, Agent, or Firm* — K&L Gates LLP

(57) ABSTRACT

An electro-optical device includes: a sealant provided between a pair of substrates in a frame shape; an electro-optical material layer formed by sealing an electro-optical material within a region surrounded by the sealant; an insulating layer provided within the region surrounded by the sealant on at least one of the pair of substrates; and an alignment layer provided between the insulating layer and the electro-optical material layer. The region surrounded by the sealant includes an effective display region where display is performed and a peripheral region located between the effective display region and the sealant, and the insulating layer within the peripheral region is formed with a recessed portion to which a material of the alignment layer flows.

7 Claims, 18 Drawing Sheets

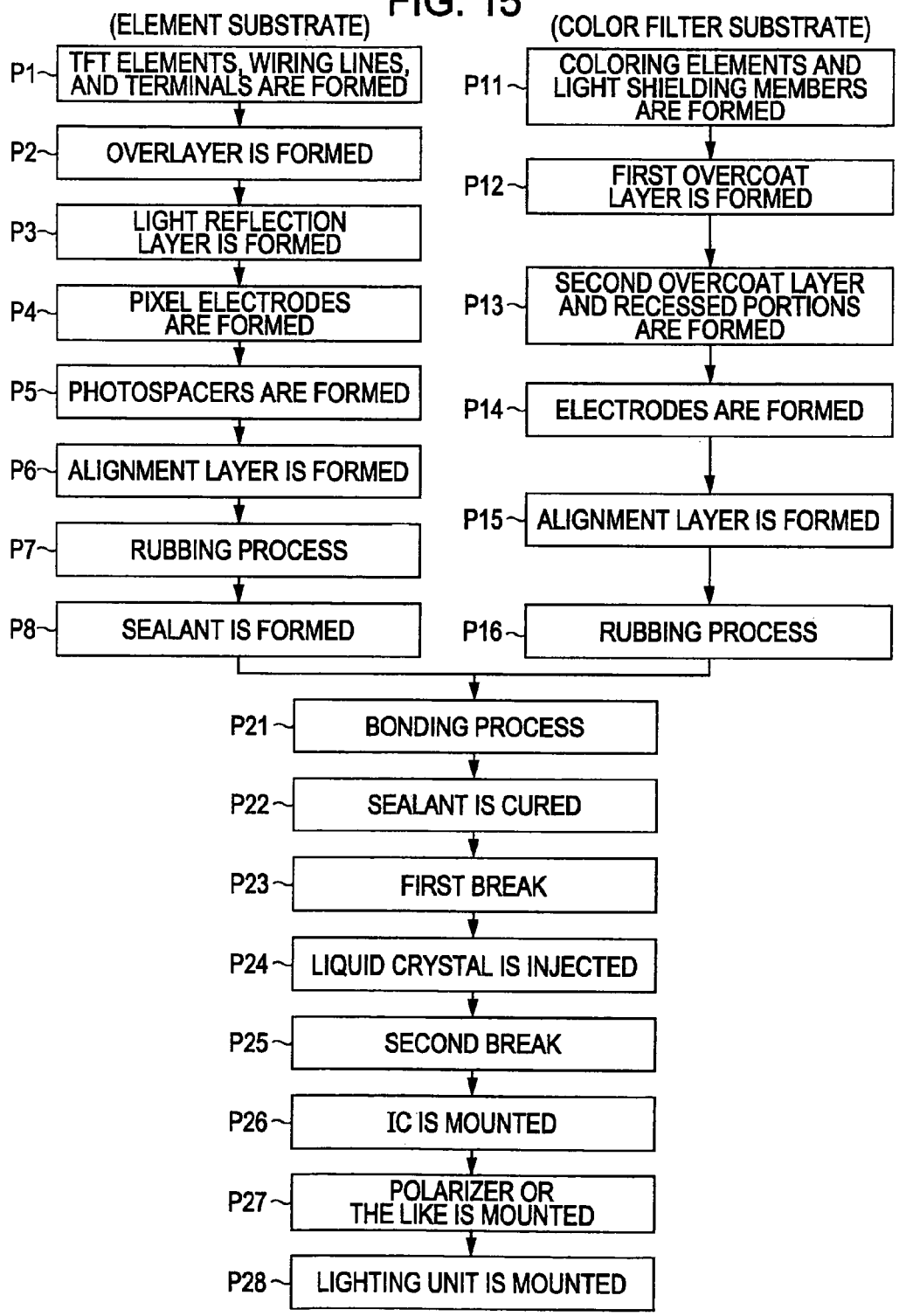

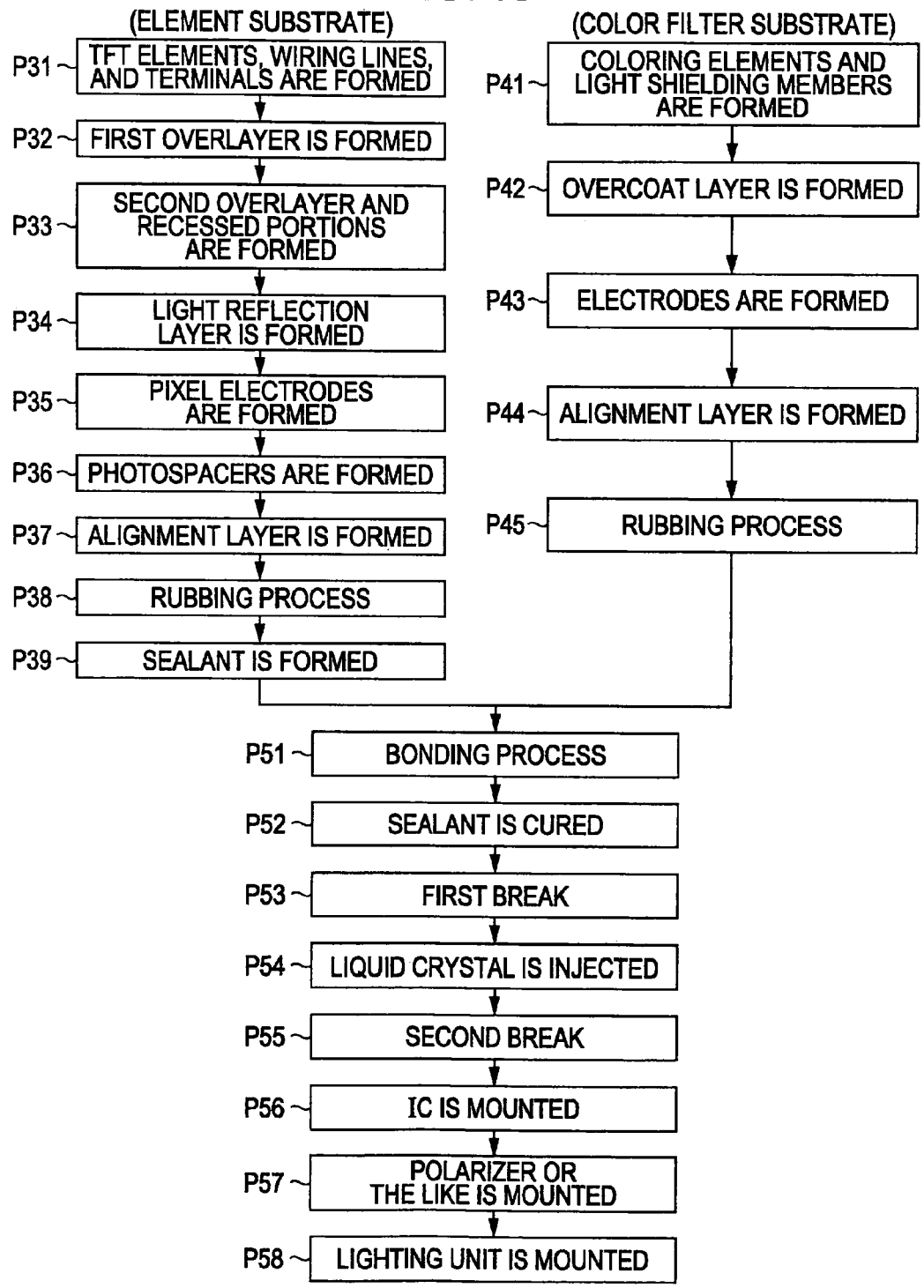

ELECTRO-OPTICAL DEVICE HAVING INSULATING LAYER WITH VARYING THICKNESS IN THE REFLECTION AND TRANSMISSION DISPLAYS

This is a Continuation of application Ser. No. 11/452,361 filed Jun. 14, 2006, which claims priority to Japanese Application No. 2005-181542 filed Jun. 22, 2005 and Japanese Application No. 2006-90367 filed Mar. 29, 2006. The disclosure of the prior applications are hereby incorporated by reference herein in their entirety.

BACKGROUND

1. Technical Field

The present invention relates to an electro-optical device such as a liquid crystal display device, to a method of manufacturing an electro-optical device, and to an electronic apparatus having the electro-optical device.

2. Related Art

An electro-optical device has been widely used in electronic apparatuses such as a mobile phone and a handheld terminal. For example, the electro-optical device has been used as a display unit of an electronic apparatus in order to visually display various information items. The electro-optical device includes a liquid crystal display device using liquid crystal as an electro-optical material.

The liquid crystal display device has a liquid crystal panel serving as an electro-optical panel. The liquid crystal panel has a structure in which, for example, a liquid crystal layer is interposed between a pair of substrates each having electrodes. In the liquid crystal display device, the alignment of liquid crystal molecules within the liquid crystal layer is controlled for each pixel by supplying light to the liquid crystal layer and controlling a voltage applied to the liquid crystal layer for each pixel. The light supplied to the liquid crystal layer is modulated according to the alignment states of the liquid crystal molecules, and the modulated light is supplied to a surface of a polarizer facing liquid crystal. As a result, images, such as characters, numbers, or figures, are displayed on a viewing-side surface of the polarizer.

The liquid crystal panel described above has an effective display region where an image is displayed and a peripheral region which is a peripheral region of the effective display region and does not contribute to the display (for example, see JP-A-2003-262856 (page 8, FIG. 1)). In addition, an alignment layer is formed on the electrodes, which are provided on each of the pair of substrates forming the liquid crystal panel, over the effective display region and the peripheral region. For example, the alignment layer may be formed by coating polyimide in a printing method.

In the electro-optical device disclosed in JP-A-2003-262856, various components, such as an insulating film, are stacked on the surfaces of the substrates forming the liquid crystal panel. Here, a case may be considered in which the height of the stacked components in the peripheral region is larger than that in the effective display region. For example, in a so-called multi-gap structure, when the thickness of a liquid crystal layer within one pixel is set to be different, the peripheral region may be higher than the effective display region. In this case, since a material of the alignment layer coated on the peripheral region flows into the effective display region, there is a possibility that the alignment layer will be formed thick at a boundary portion between the effective display region and the peripheral region. If the alignment layer is formed thick at the boundary portion between the effective display region and the peripheral region, the thickness of the alignment layer is not uniform at the effective display region and thus the alignment failure occurs at a portion where the alignment layer is formed thick. As a result, there is a possibility that the display brightness will become non-uniform.

SUMMARY

An advantage of some aspects of the invention is that it provides an electro-optical device with a structure having an effective display region and a peripheral region, which can prevent the display brightness from becoming non-uniform by uniformly coating an alignment layer in both the effective display region and the peripheral region.

According to an aspect of the invention, an electro-optical device includes: a sealant provided between a pair of substrates in a frame shape; an electro-optical material layer formed by sealing an electro-optical material within a region surrounded by the sealant; an insulating layer provided within the region surrounded by the sealant on at least one of the pair of substrates; and an alignment layer provided between the insulating layer and the electro-optical material layer. The region surrounded by the sealant includes an effective display region where display is performed and a peripheral region located between the effective display region and the sealant. The insulating layer within the peripheral region is formed with a recessed portion to which a material of the alignment layer flows.

The alignment layer is formed by coating solution made of a material, such as polyimide, on a substrate by means of a spin coating method, and then burning the coated material, for example. In the conventional electro-optical device, when a material of an alignment layer is coated, there is a possibility that the material will excessively flow into the effective display region from the peripheral region. In this case, the thickness of the alignment layer becomes non-uniform between the peripheral region and the effective display region. As a result, the display brightness may be unevenly distributed.

In the electro-optical device described above, the recessed portion to which the material of the alignment layer flows is formed within the peripheral region. Accordingly, when the alignment layer is formed within the peripheral region, the material of the alignment layer can flow into the recessed portion in the peripheral region. Thus, when the alignment layer is formed on the substrate, it is possible to prevent the material of the alignment layer from flowing excessively from the peripheral region into the effective display region. As a result, since the alignment layer can be uniformly formed in both the effective display region and the peripheral region, it is possible to prevent the display brightness from becoming non-uniform.

Further, in the electro-optical device described above, preferably, a part, which is adjacent to the peripheral region, of the insulating layer within the effective display region is thinner than the insulating layer within the peripheral region. In the case when a thin insulating layer exists within the effective display region adjacent to the peripheral region, a material of the alignment layer coated in the peripheral region easily flows to the part. In this case, the thickness of the alignment layer within the effective display region becomes easily non-uniform. Even in this electro-optical device, by forming the recessed portion within the peripheral region, the material of the alignment layer coated in the peripheral region can flow into the recessed portion. As a result, the alignment layer can be uniformly formed in both the effective display region and the peripheral region.

Furthermore, in the electro-optical device described above, preferably, the recessed portion is a groove extending along the effective display region.

Furthermore, in the electro-optical device described above, preferably, the recessed portion is a circular groove surrounding the effective display region.

Furthermore, in the electro-optical device described above, preferably, the recessed portion is a circular groove. In this case, since the material of the alignment layer coated in the peripheral region can flow evenly into the recessed portion over the entire circumference of the peripheral region, it is possible to form the alignment layer even more uniformly in both the effective display region and the peripheral region.

Furthermore, in the electro-optical device described above, preferably, the effective display region includes a reflective display region where reflective display is performed and a transmissive display region where transmissive display is performed. In addition, preferably, the insulating layer within the effective display region is formed at least in the reflective display region so as to make the thickness of the electro-optical material layer in the reflective display region smaller than the thickness of the electro-optical material layer in the transmissive display region, and the insulating layer within the reflective display region is formed to have the same thickness as the insulating layer within the peripheral region.

The electro-optical device is a transflective electro-optical device with a so-called multi-gap structure. In the electro-optical device, since the insulating layer in the transmissive display region is formed thinner than the insulating layer in the peripheral region, the material of the alignment layer coated in the peripheral region is likely to flow excessively into the effective display region, in particular, the transmissive display region. As a result, the thickness of the alignment layer within the effective display region becomes easily non-uniform. Even in this electro-optical device, it is possible to uniformly form the alignment layer in both the effective display region and the peripheral region by providing the recessed portion within the peripheral region.

Further, in the electro-optical device described above, preferably, the height of the insulating layer located between the transmissive display region adjacent to the peripheral region and the recessed portion is smaller than the height of the insulating layer located between the reflective display region and the recessed portion. Thus, since it is possible to eliminate a portion where the thickness of the insulating layer changes abruptly between the transmissive display region and the peripheral region, it is possible to prevent a layer formed on the insulating layer between the transmissive display region and the peripheral region, for example, a layer including electrodes, from being broken.

Further, in the electro-optical device described above, preferably, spacer members are respectively provided in both the reflective display region and the peripheral region where the recessed portion is not formed. Thus, it is possible to maintain the electro-optical material layer having a predetermined thickness even in the peripheral region, in the same manner as the effective display region. As a result, it is possible to prevent non-uniform display due to variation in the thickness of the electro-optical material layer from occurring in the vicinity of a boundary between the effective display region and the peripheral region.

Furthermore, in the electro-optical device described above, preferably, the spacer members are photospacers. Thus, it is possible to form the spacer members at the same time when the insulating layer is formed in the effective display region and the peripheral region.

Further, according to another aspect of the invention, an electro-optical device includes: a pair of substrates; an electro-optical material interposed between the pair of substrates; an effective display region having a reflective display region where reflective display is performed and a transmissive display region where transmissive display is performed; and a peripheral region located outside the effective display region. At least one of the pair of substrates includes an insulating layer and an alignment layer provided on the insulating layer facing the electro-optical material. The insulating layer is formed at least in the reflective display region and the peripheral region such that the thickness of the electro-optical material in the reflective display region becomes smaller than the thickness of the electro-optical material in the transmissive display region, and the insulating layer within the peripheral region is formed with a recessed portion to which a material of the alignment layer flows. The effective display region, in which the electro-optical material is thick due to the insulating layer, is connected to the recessed portion in the peripheral region.

Furthermore, in the electro-optical device described above, preferably, one of the pair of substrates includes a coloring layer covered by the insulating layer.

Furthermore, in the electro-optical device described above, preferably, one of the pair of substrates includes switching elements covered by the insulating layer.

Further, according to still another aspect of the invention, a method of manufacturing an electro-optical device having an effective display region where display is performed and a peripheral region located around the effective display region includes: forming an insulating layer in the effective display region and the peripheral region; and patterning the insulating layer in a predetermined shape. In the patterning, the insulating layer within the peripheral region is formed with a recessed portion.

In the method of manufacturing an electro-optical device described above, in the patterning, the recessed portion to which the material of the alignment layer flows is formed within the peripheral region. Accordingly, when the alignment layer is formed within the peripheral region, the material of the alignment layer can flow into the recessed portion in the peripheral region. Thus, when the alignment layer is formed on the substrate, it is possible to prevent the material of the alignment layer from flowing excessively from the peripheral region into the effective display region. As a result, since the alignment layer can be uniformly formed in both the effective display region and the peripheral region, it is possible to prevent the display brightness from becoming non-uniform.

Furthermore, in the method of manufacturing an electro-optical device described above, preferably, in the patterning, the recessed portion is formed in the peripheral region, and at the same time, the insulating layer within the transmissive display region is made thin or removed by patterning the insulating layer within the transmissive display region. In this case, since it is possible to pattern the recessed portion and the insulating layer in the transmissive display region with only one patterning process, the recessed portion can be formed without increasing the number of manufacturing processes.

Furthermore, it is preferable that the method of manufacturing an electro-optical device further include coating an alignment layer on the insulating layer after the patterning. In addition, preferably, in the coating of the alignment layer, a material of the alignment layer flows into the recessed portion of the insulating layer.

Further, according to still another aspect of the invention, an electronic apparatus includes the electro-optical device described above. In the electro-optical device, since the alignment layer can be uniformly formed in both the effective display region and the peripheral region by providing the recessed portion, to which the material of the alignment layer flows, within the peripheral region, it is possible to prevent the display brightness from becoming non-uniform. Therefore, even in the electronic apparatus using the electro-optical device described above, it is possible to prevent the display brightness from becoming non-uniform.

BRIEF DESCRIPTION OF THE DRAWINGS

The invention will be described with reference to the accompanying drawings, wherein like numbers reference like elements, and wherein:

FIG. 15 is a flow chart illustrating a method of manufacturing an electro-optical device according to still another embodiment of the invention.

FIG. 16 is a flow chart illustrating a method of manufacturing an electro-optical device according to still another embodiment of the invention.

DESCRIPTION OF EXEMPLARY EMBODIMENTS

First Embodiment of Electro-Optical Device

Figure 1:
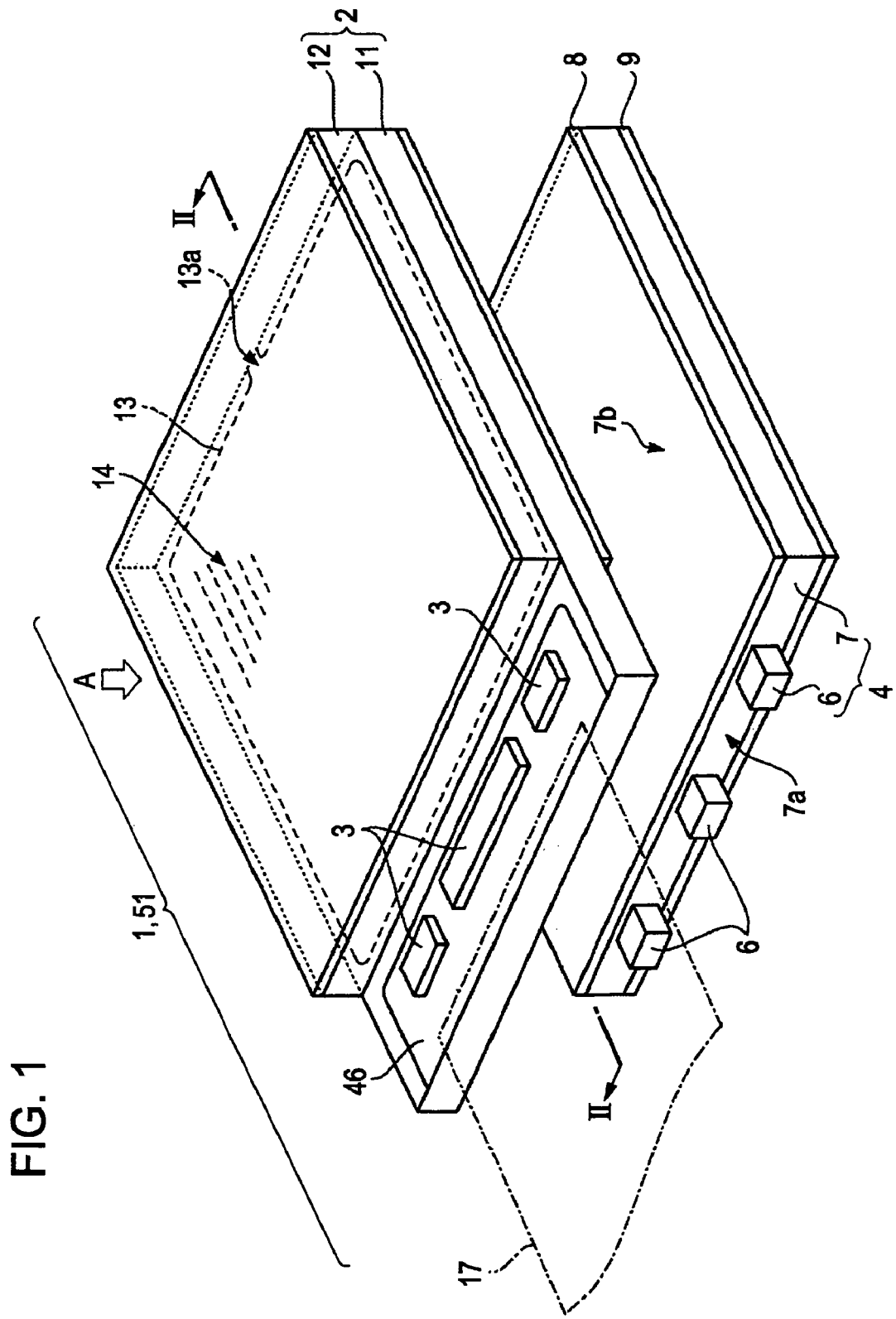
FIG. 1 is a perspective view illustrating an electro-optical device according to an embodiment of the invention.

Hereinafter, an electro-optical device and a method of manufacturing an electro-optical device according to an embodiment of the invention will be described. However, it is to be understood that the invention is not limited to the embodiment. In addition, in the following description, the scale of each layer or member is adjusted in order to have a recognizable size in the drawings.

Figure 2:
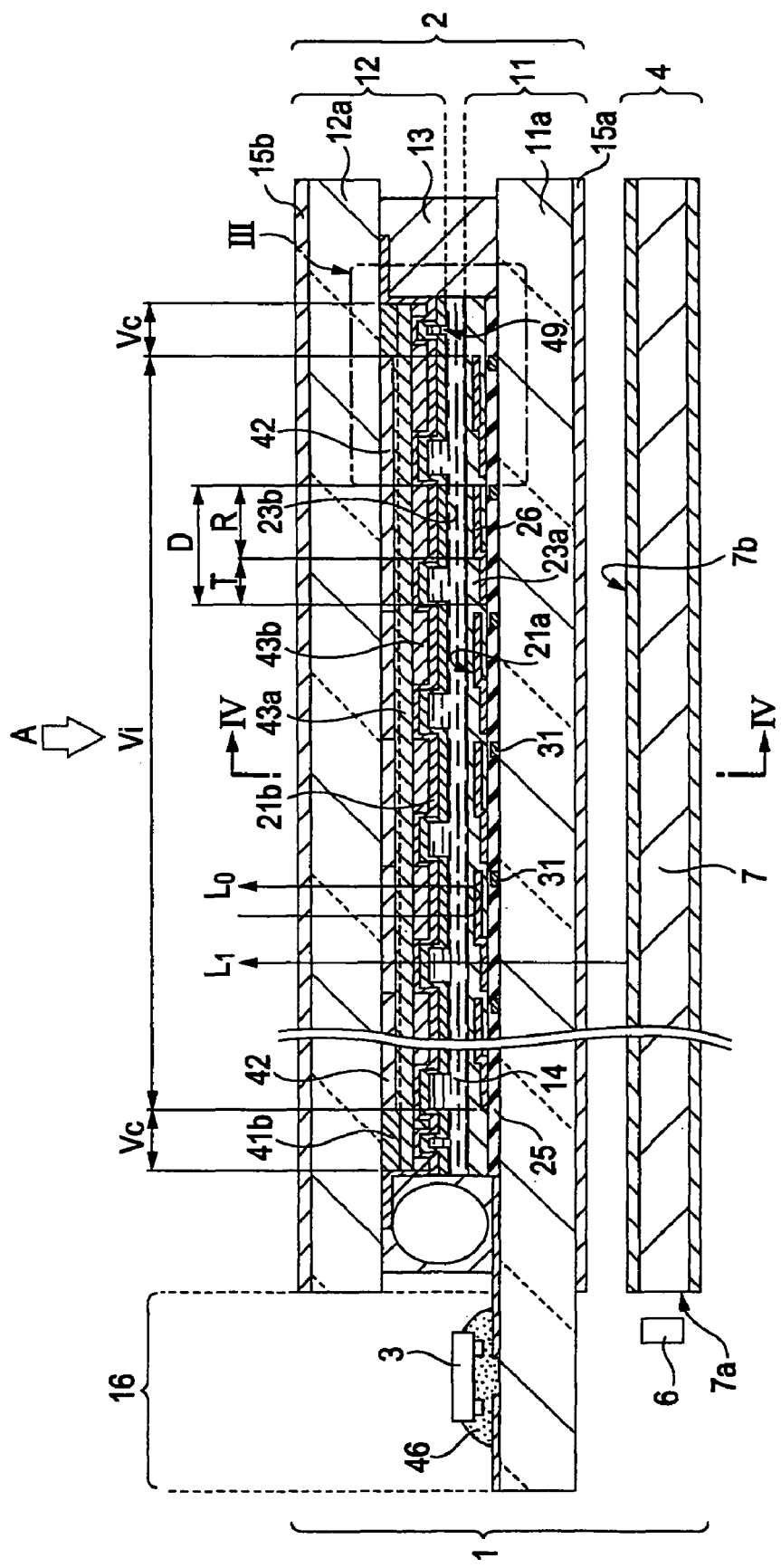
FIG. 2 is a cross-sectional view taken along the line II-II of FIG. 1.
Figure 3:
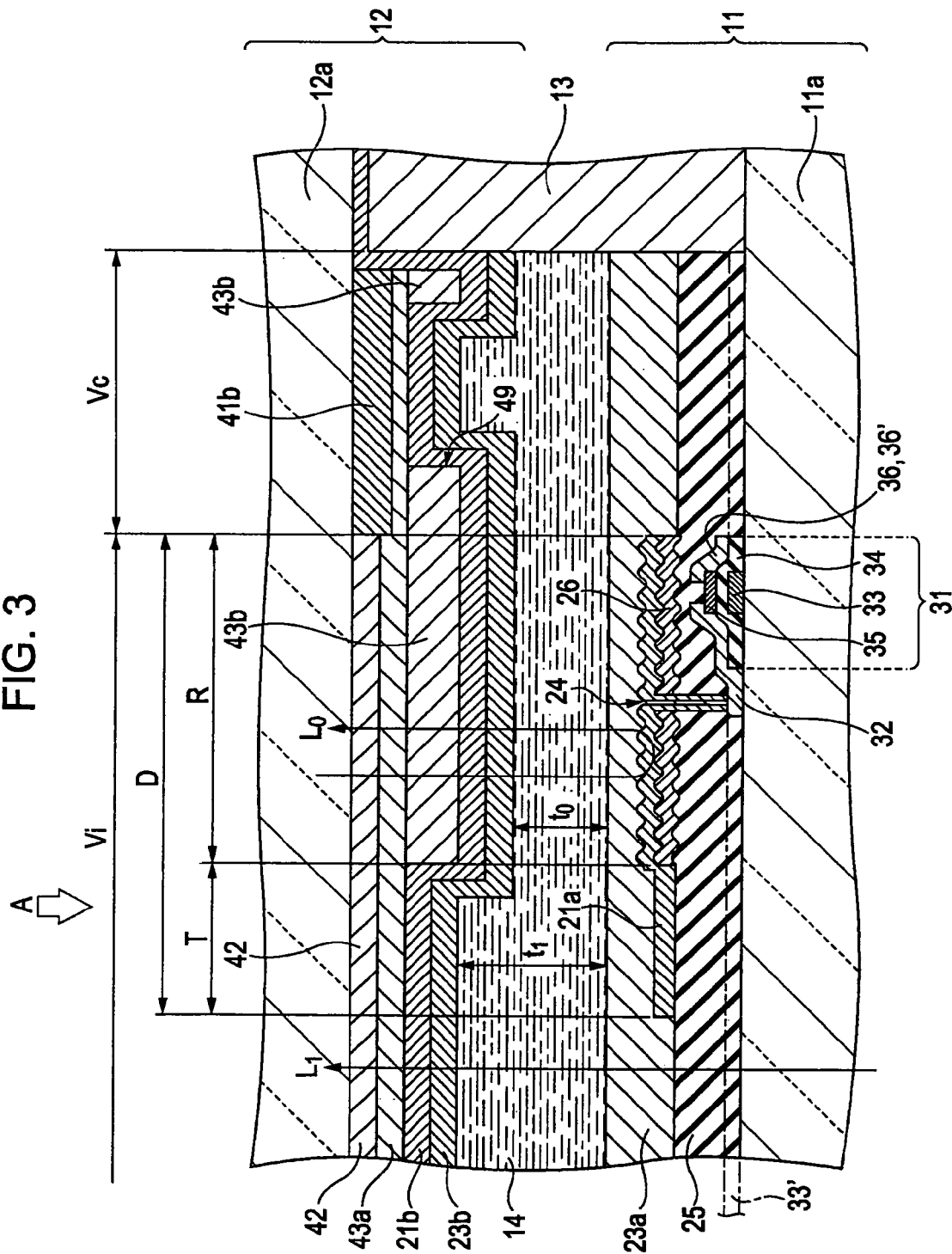
FIG. 3 is an enlarged cross-sectional view illustrating a portion indicated by an arrow 'E' of FIG. 2.
Figure 4:
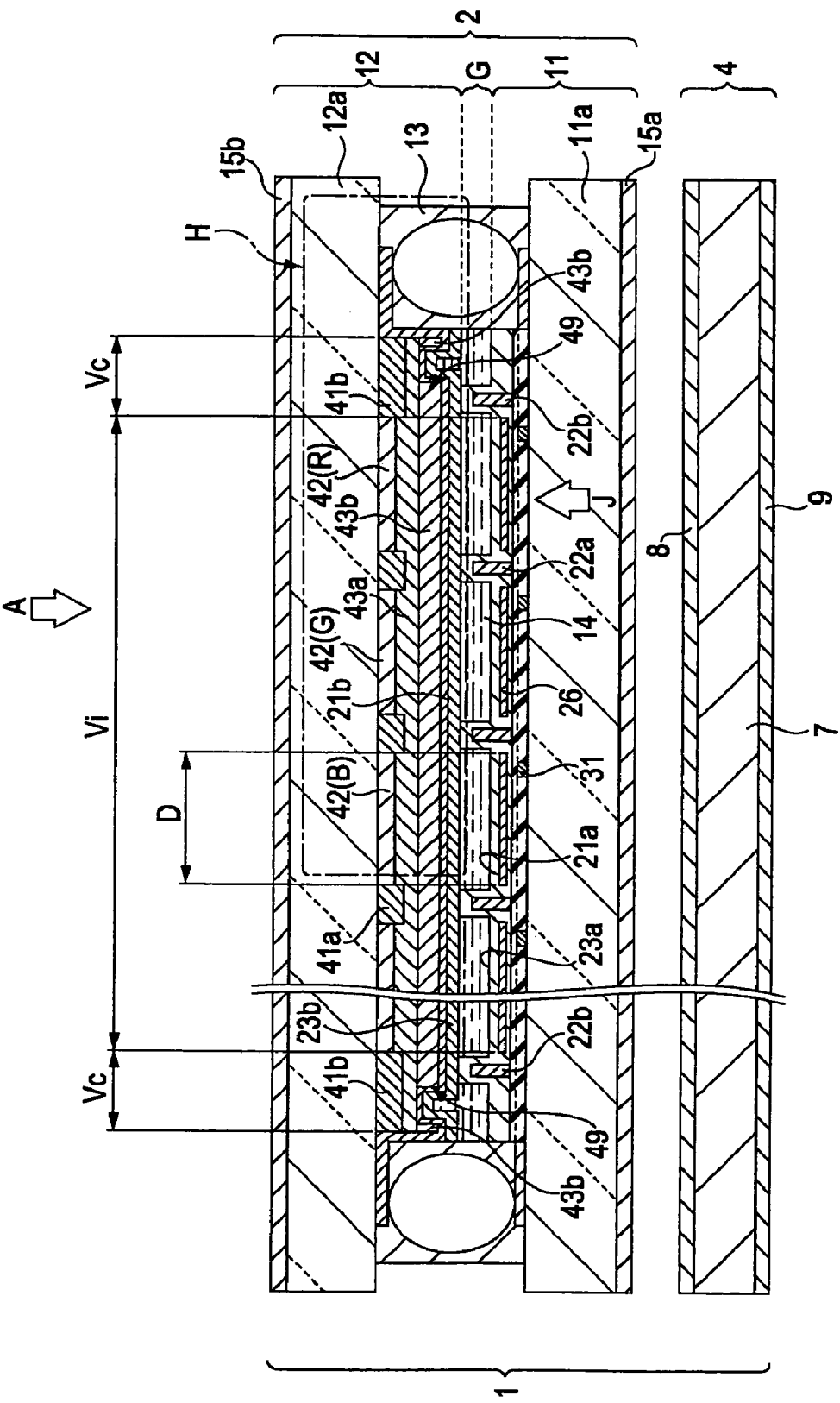
FIG. 4 is a cross-sectional view taken along the line IV-IV of FIG. 2.
Figure 5:
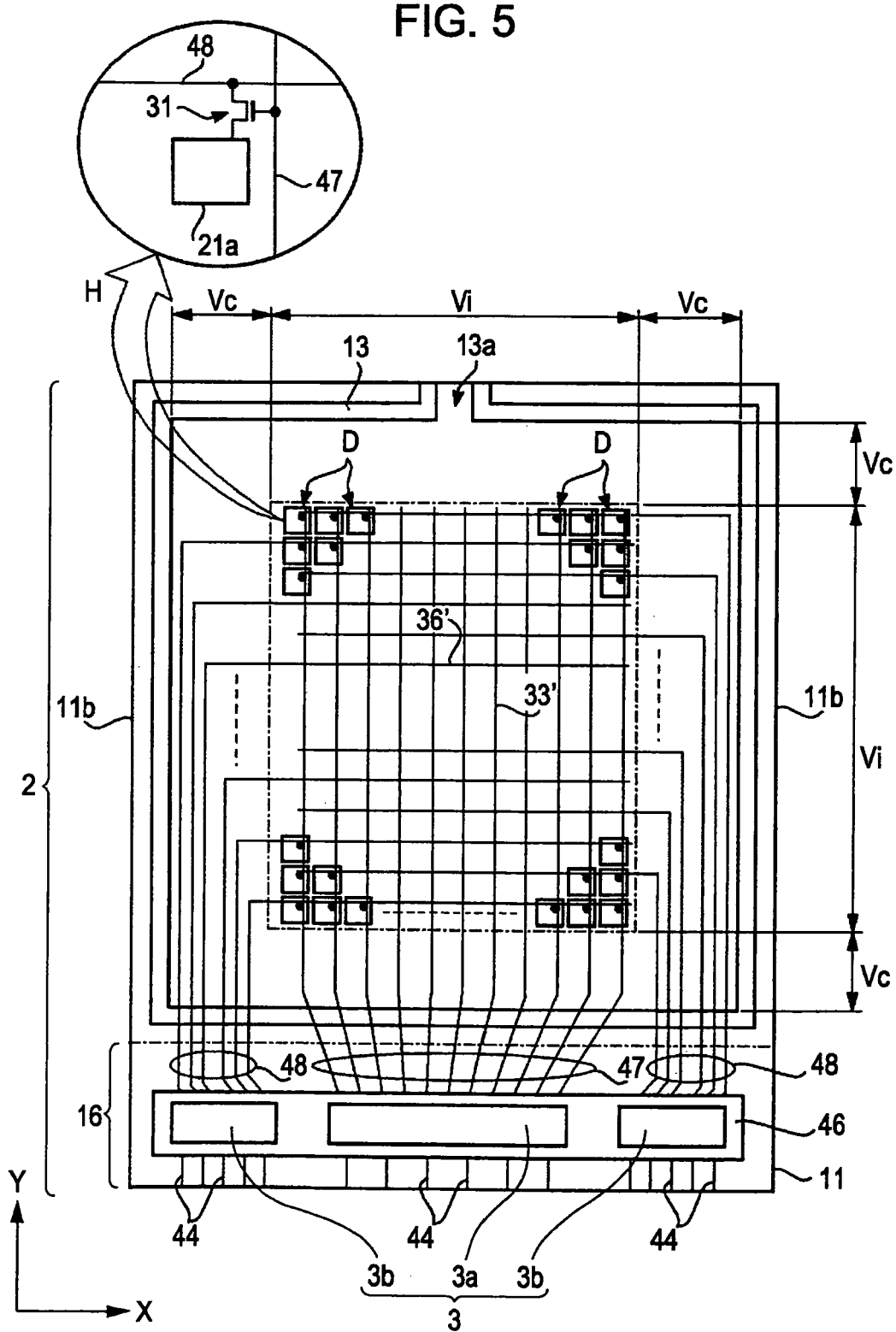
FIG. 5 is a plan view illustrating a liquid crystal panel shown in FIG. 1 as viewed from an arrow 'A' of FIG. 1.
Figure 6:
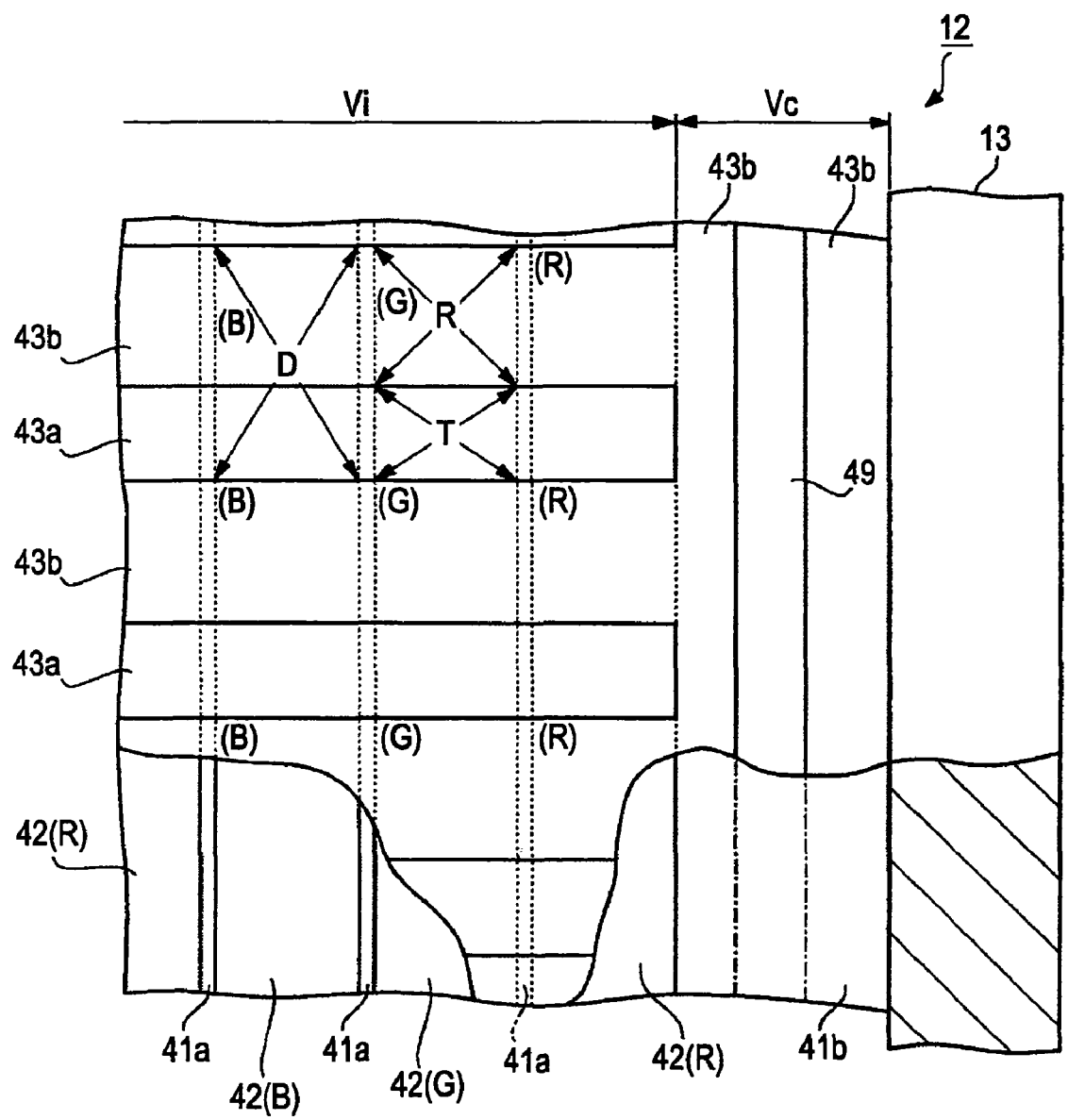
FIG. 6 is a plan view illustrating a portion indicated by an arrow 'H' of FIG. 4.

FIG. 1 illustrates a liquid crystal display device which is the electro-optical device according to an embodiment of the invention. FIG. 2 is a cross-sectional view taken along the line II-II of FIG. 1. FIG. 3 is an enlarged view illustrating a portion indicated by an arrow 'E' of FIG. 2. FIG. 4 is a cross-sectional view taken along the line IV-IV of FIG. 2. FIG. 5 is a plan view illustrating the liquid crystal panel shown in FIG. 1 as viewed from an arrow 'A'. In FIG. 5, elements or wiring lines are mainly shown and components other than the elements and the wiring lines are omitted in order that a main structure can be easily recognized. In addition, FIG. 6 is a plan view illustrating a portion indicated by an arrow 'H' of FIG. 4 as viewed from a direction indicated by an arrow 'J' of FIG. 4.

In the present embodiment, there is used an active-matrix-type liquid crystal display device using TFT (thin film transistor) elements, which are three-terminal-type active elements, as switching elements. In addition, the liquid crystal display device in the present embodiment is a transflective liquid crystal display device capable of performing the color display. In addition, even though the TFT elements include various elements, such as an amorphous silicon TFT, a low-temperature polysilicon TFT, or a high-temperature silicon TFT, the amorphous silicon TFT is used in the present embodiment. Further, the invention can also be applied to liquid crystal display devices using TFT elements other than the TFT elements described above.

Referring to FIG. 1, the liquid crystal display device 1 in the present embodiment includes a liquid crystal panel 2 serving as an electro-optical panel, driving ICs 3 that are mounted on the liquid crystal panel 2 and serve as semiconductor elements, and a lighting unit 4 attached to the liquid crystal panel 2. In the liquid crystal display device 1, a direction indicated by the arrow 'A' is a viewing side, and the lighting unit 4 is disposed on a back side of the liquid crystal panel 2 with respect to the liquid crystal panel 2 and serves as a backlight.

The lighting unit 4 has LEDs (light-emitting diodes) 6 serving as dot-shaped light sources, and a light guiding member 7 that modulates the dot-shaped light emitted from the LEDs 6 to planar light and then outputs the modulated light to the liquid crystal panel 2. The light guiding member 7 is made of transparent resin, for example. The LEDs 6 are provided such that a light-emitting surface of each of the LEDs 6 faces a light incidence surface 7a which is one side surface of the light guiding member 7. The light emitted from each of the LEDs 6 is incident on the light guiding member 7 through the light incidence surface 7a. Then, the light introduced into the light guiding member 7 is output as the planar light through a light radiation surface 7b to be then supplied to the liquid crystal panel 2. In addition, as necessary, a light diffusion layer 8 may be formed on the light radiation surface 7b of the light guiding member 7. In addition, as necessary, a light reflection layer 9 may be formed on a surface opposite to the light radiation surface 7b of the light guiding member 7. In addition, the light source may be formed by using a dot-shaped light source and a line-shaped light source, such as a cold cathode tube, other than the LEDs 6.

The liquid crystal panel 2 includes a pair of substrates 11 and 12 bonded to each other by a sealant 13 having a frame shape. Each of the substrates 11 and 12 has a rectangular or square shape as viewed from the arrow 'A'. The substrate 11 is an element substrate on which switching elements are formed. In addition, the substrate 12 is a color filter substrate on which color filters are formed. The sealant 13 has a liquid crystal injection hole 13a, and liquid crystal serving as an electro-optical material, for example, TN (twisted nematic) liquid crystal is injected between the element substrate 11 and the color filter substrate 12 through the liquid crystal injection hole 13a. Thus, a liquid crystal layer 14 serving as an electro-optical material is formed. The liquid crystal injection hole 13a is sealed with resin after the injection of the liquid crystal is completed. In addition, as a mode of liquid crystal, various kinds of liquid crystal other than the TN liquid crystal may be used as necessary. For example, it is possible to use liquid crystal having a negative dielectric anisotropy, that is, vertically-aligned-mode liquid crystal.

Referring to FIG. 2, the element substrate 11 includes a first transmissive substrate 11a having a rectangular or square shape as viewed from the direction indicated by the arrow 'A' which is a viewing side. The first transmissive substrate 11a is formed of, for example, a transparent glass, a transparent plastic, or the like. In addition, a polarizer 15a is mounted on an outer surface of the first transmissive substrate 11a by means of a bonding process, for example. If necessary, an optical element other than the polarizer 15a, for example, a retardation film may be additionally provided.

Further, a plurality of TFT elements 31 serving as active elements or switching elements is formed on an inner surface of the first transmissive substrate 11a. An interlayer insulating layer 25 serving as an insulating layer is formed so as to cover the TFT elements 31. The interlayer insulating layer 25 is formed by patterning transparent, photosensitive, and insulating resin, for example, acrylic resin by means of a photolithographic process.

Furthermore, a plurality of pixel electrodes 21a is formed on a surface of the interlayer insulating layer 25. The plurality of pixel electrodes 21a is formed of metal oxide, such as ITO (indium tin oxide), by means of a photo-etching process. The plurality of pixel electrodes 21a is formed in dot shapes as viewed from the direction indicated by the arrow 'A', and the plurality of pixel electrodes 21a is arranged in a matrix of horizontal and vertical directions, that is, in row and column directions or X-Y directions.

As shown in FIG. 3, a light reflection layer 26 made of, for example, aluminum (AL) or an Al alloy is formed between the pixel electrodes 21 and the interlayer insulating layer 25. In the present embodiment, the light reflection layer 26 is formed in a dot matrix at the location corresponding to each of the plurality of pixel electrodes 21a. In addition, the light reflection layer 26 is provided on a part of the pixel electrodes 21a. That is, between the pixel electrodes 21a and the interlayer insulating layer 25, a region R where the light reflection layer 26 exists and a region T where the light reflection layer 26 does not exist. The region R where the light reflection layer 26 exists is a region where a reflective display is performed by using external light L0, that is, a reflective display region R.

On the other hand, the region T where the light reflection layer 26 does not exist is a region where a transmissive display is performed by using light L1 emitted from the lighting device 4, that is, a transmissive display region T.

On a surface of the interlayer insulating layer 25 corresponding to the reflective display region R, irregularities are formed in order to scatter light. As a result, irregularities are also formed on the light reflection layer 26 and the pixel electrodes 21a that are located on the irregularities formed on the surface of the interlayer insulating layer 25 corresponding to the reflective display region R. For this reason, light reflected from the light reflection layer 26 becomes scattered light. Thus, it is possible to prevent specular reflection on the light reflection layer 26.

Further, a layer including the pixel electrodes 21a and a layer including the TFT elements 31 are separated from each other by providing the interlayer insulating layer 25 below the pixel electrodes 21a. In this structure, a surface of the element substrate 11 can be effectively utilized as compared with a structure in which the pixel electrodes 21a and the TFT elements 31 are formed on the same layer. For example, since the area of each of the pixel electrodes 21a, that is, the pixel area can be made large, it is possible to make display in the liquid crystal display device 1 easily viewed.

The interlayer insulating layer 25 is formed to cover the TFT elements 31. The pixel electrodes 21a are formed on the interlayer insulating layer 25. The interlayer insulating layer 25 is formed with contact holes 24 that are provided to electrically connect the pixel electrodes 21a and the TFT elements 31 to each other. The contact holes 24 are formed while the interlayer insulating layer 25 is being formed by a photolithographic process. The contact holes 24 are formed at positions where the contact holes 24 do not overlap the TFT elements 31 and overlap the pixel electrodes 21a in plan view from the direction indicated by the arrow 'A'.

In the present embodiment, the TFT elements 31 are amorphous silicon TFTs, and each of the TFT elements 31 has a gate electrode 33, a gate insulating layer 34, a semiconductor layer 35 made of, for example, amorphous silicon, a source electrode 36, and a drain electrode 32. One end of the drain electrode 32 is connected to the semiconductor layer 35 and the other end of the drain electrode 32 is connected to each of the pixel electrodes 21a through each of the contact holes 24. The source electrode 36 is formed as a part of a source electrode line 36' extending in a direction perpendicular to the plane in the drawing in FIG. 3. In addition, the gate electrode 33 extends from a gate electrode line 33' that extend in the direction perpendicular to the source electrode line 36', that is, in the left and right directions of FIG. 3.

Referring to FIG. 4, a plurality of photospacers 22a serving as spacer members is formed at predetermined distances on a region between the plurality of pixel electrodes 21a, that is, on a part of the interlayer insulating layer 25 serving as a light shielding region or a black mask region. For example, the photospacers 22a are formed by patterning the photosensitive resin by means of the photolithographic process. Each of the photospacers 22a has, for example, an upright cylindrical or prismatic shape and serves to make the cell gap G uniform.

An alignment layer 23a is formed on the pixel electrodes 21a and the photospacers 22a. In addition, an alignment process, for example, a rubbing process is performed on the alignment layer 23a, and thus the initial alignment of liquid crystal molecules in the vicinity of the alignment layer 23a is determined. For example, the alignment layer 23a is formed by coating polyimide solution and then curing the polyimide solution or by using an offset printing process.

Referring to FIG. 2, the color filter substrate 12 opposite to the element substrate 11 includes a second transmissive substrate 12a having a rectangular or square shape as viewed from the viewing side indicated by the arrow 'A'. The second transmissive substrate 12a is formed of, for example, a transparent glass, a transparent plastic, or the like. In addition, a polarizer 15b is mounted on an outer surface of the second transmissive substrate 12a by means of a bonding process, for example. If necessary, an optical element other than the polarizer 15b, for example, a retardation film may be additionally provided.

Further, a plurality of coloring elements 42 is formed on an inner surface of the second transmissive substrate 12a. Each of the plurality of coloring elements 42 is colored with blue (B), green (G), and red (R) colors or cyan (C), magenta (M), and yellow (Y) colors, and the plurality of coloring elements 42 is disposed in a predetermined arrangement as viewed from the direction indicated by the arrow 'A'. In the present embodiment, as shown in FIG. 6, a stripe arrangement method is used in which the coloring elements 42 having the colors B, G, and R are respectively arranged parallel to one another. It is, however, to be noted that arrangement methods other than the stripe arrangement method, such as a mosaic arrangement or a delta arrangement, can be adopted. A light shielding member 41a is provided between the coloring elements 42 in a strip shape as viewed from the direction indicated by the arrow 'A'. The light shielding member 41a may be formed by overlapping all of the coloring elements 42 having the different colors B, G, and R or by overlapping two of the coloring elements 42 having the different colors B, G, and R. In addition, the light shielding member 41a may be formed by using a light shielding metal material, such as chrome (Cr).

Referring to FIG. 4, a first overcoat layer 43a is formed on the light shielding member 41a and the coloring elements 42. In addition, a second overcoat layer 43b is formed on the first overcoat layer 43a. A common electrode 21b is provided on the first overcoat layer 43a and the second overcoat layer 43b, and then an alignment layer 23b is formed on the common electrode 21b. For example, the common electrode 21b is formed by the photo-etching process in which an ITO is used as a material. The common electrode 21b has a plane-shaped electrode that is formed on the second transmissive substrate 12a with a uniform thickness. In addition, an alignment process, for example, a rubbing process is performed on the alignment layer 23b, and thus the initial alignment of liquid crystal molecules in the vicinity of the alignment layer 23b is determined. For example, the alignment layer 23b is formed by coating polyimide solution and then curing the polyimide solution or by using an offset printing process.

As shown in FIG. 2, the second overcoat layer 43b is formed on only a portion, corresponding to the reflective display region R, of each of the pixel electrodes 21a formed on the element substrate 11 opposite thereto. The first overcoat layer 43a and the second overcoat layer 43b are formed by coating an epoxy-based or acrylic-based resin material and then curing the epoxy-based or the acrylic-based resin material or, if necessary, by performing a photolithographic process for the epoxy-based or the acrylic-based resin material.

The second overcoat layer 43b serves to adjust the thickness of the liquid crystal layer 14 between the reflective display region R and the transmissive display region T. Specifically, in FIG. 3, the second overcoat layer 43b having a predetermined thickness is provided in the reflective display region R where the light reflection layer 26 is formed. For this reason, the thickness t0 of the liquid crystal layer 14 corresponding to the reflective display region R is set to be small.

On the other hand, the second overcoat layer 43b is not provided in the transmissive display region T where the light reflection layer 26 is not formed. That is, only the first overcoat layer 43a is provided in the transmissive display region T. For this reason, the thickness t1 of the liquid crystal layer 14 corresponding to the transmissive display region T is set to be larger than the thickness t0 of the liquid crystal layer 14 corresponding to the reflective display region R, that is, t1>t0.

When the reflective display is performed, the reflected light L0 passes through the liquid crystal layer 14 twice. In contrast, the transmissive display is performed, the transmissive light L1 passes through the liquid crystal layer 14 only once. For this reason, if the liquid crystal layer 14 is set to satisfy a condition of t1=t0, there is a possibility that the display concentration will be non-uniform between the reflective display and the transmissive display. Accordingly, if the liquid crystal layer 14 is set to satisfy the condition of t1>t0, it is possible to make the lengths of the optical paths of the reflected light L0 and the transmissive light L1, which pass through the liquid crystal layer 14, equal or approximate to each other. As a result, it is possible to perform display having uniform concentration between the reflective display and the transmissive display.

Further, in the embodiment shown in FIG. 3, the second overcoat layer 43b is not provided in the transmissive display region T, that is, the thickness of the second overcoat layer 43b is set to zero. However, as long as the thickness of the second overcoat layer 43b satisfies the condition of t1>t0, the thickness of the second overcoat layer 43b in the transmissive display region T is not limited to zero. In addition, in the present embodiment, even though two overcoat layers of the first overcoat layer 43a and the second overcoat layer 43b are provided, it is possible to provide only one overcoat layer as long as the thickness of the liquid crystal layer 14 satisfies the condition of t1>t0. In other words, by setting the thickness of an overcoat layer in the transmissive display region T to be smaller than that in the reflective display region R, it is possible to make the thickness of the liquid crystal layer 14 corresponding to the reflective display region R smaller than the thickness of the liquid crystal layer 14 corresponding to the transmissive display region T.

Referring to FIG. 2, the plurality of pixel electrodes 21a formed on the element substrate 11 is arranged in a dot matrix as viewed from the direction indicated by the arrow 'A'. The pixel electrodes 21a overlap the common electrode 21b as viewed from the direction indicated by the arrow 'A'. A region where each of the pixel electrodes 21a and the common electrode 21b overlap each other becomes a sub-pixel region D which is a minimum display region. Each of the coloring elements 42 formed on the color filter substrate 12 is provided so as to correspond to the sub-pixel region D. In the case of black display in which the coloring elements 42 are not used, one sub-pixel region D forms one pixel. However, in the case of a structure in which the color display is performed by using the coloring elements 42 having the three colors as in the present embodiment, one pixel is formed by a group composed of the three coloring elements 42 corresponding to the colors B, G, and R or a group composed of the three coloring elements 42 corresponding to the colors C, M, and Y. As shown in FIG. 6, one side of the sub-pixel region D in the longitudinal direction thereof is the reflective display region R defined by the light reflection layer 26, and the other side of the sub-pixel region D is the transmissive display region T where the light reflection layer 26 is not formed.

Referring to FIG. 2, the element substrate 11 is formed to extend from one side surface of the color filter substrate 12, which forms an extended portion. Driving ICs 3 are mounted on a surface of the extended portion 16. In the present embodiment, as shown in FIG. 5, one driving IC 3a and two driving ICs 3b are mounted. For example, a mounting operation can be performed by using a COG (chip on glass) technique in which an ACF (anisotropic conductive film) 46 is used.

On the surface of the extended portion 16, a plurality of wiring lines 47 and 48 and a plurality of external connection terminals 44 are formed by the photo-etching process. The plurality of wiring lines 47 is formed so as to extend toward a region surrounded by the sealant 13 and in the Y direction. Each of the wiring lines 47 is directly connected to each of the gate electrode lines 33' (refer to FIG. 3) formed on the element substrate 11 so as to serve as a scanning line. The plurality of wiring lines 48 is formed to extend in the Y direction along a side surface 11b of the element substrate 11 within the region surrounded by the sealant 13. In addition, the plurality of wiring lines 48 is formed to be bent and then extend in the X direction. Each of the wiring lines 48 is directly connected to each of the source electrode lines 36' (refer to FIG. 3) formed on the element substrate 11 so as to serve as a data line.

On the element substrate 11, each of the sub-pixel regions D is formed at the intersection between the scanning line 47 and the data line 48. When each sub-pixel region D is shown in an equivalent electrical circuit, the TFT element 31 and the pixel electrode 21a are connected in series to each other, as can be seen in an enlarged view indicated by an arrow 'H' of FIG. 5. In addition, the scanning line 47 and the data line 48 are connected to the TFT element 31. Each of the scanning lines 47 is driven by a scanning line driving circuit composed of the driving IC 3a. On the other hand, each of the data lines 48 is driven by a data line driving circuit composed of the driving ICs 3b. In addition, the scanning line driving circuit and the data line driving circuit may be formed of a common driving IC.

As shown in FIG. 1, an edge of the extended portion 16 is connected to an FPC (flexible printed circuit) substrate 17, which is a flexible wiring substrate, by means of the ACF 46, for example. On the FPC substrate 17, a plurality of electronic components (not shown) that are needed to drive the liquid crystal panel 2 is mounted. The electronic components may include a resistor, a coil, a capacitor, a power supply IC, or the like. In addition, an external input device (for example, a control circuit of an electronic apparatus such as a mobile phone), an external power supply, and the like are connected to the FPC substrate 17. Accordingly, signals or power for driving the liquid crystal panel 2 is supplied from the input device or the external power supply through the FPC substrate 17.

Referring to FIG. 5, the plurality of sub-pixel regions D are arranged in a matrix. Because the plurality of sub-pixel regions D are arranged in a matrix, an effective display region Vi is formed and an image is displayed in the effective display region Vi. As a peripheral region of the effective display region Vi, a region between the effective display region Vi and an inner surface of the sealant 13 is a peripheral region Vc. The peripheral region Vc is a region where the wiring lines 48 are provided and images are not displayed.

According to the liquid crystal display device 1 constructed above, in FIG. 2, in a case in which the liquid crystal display device 1 is located outside or inside a room where it is bright, reflective display is performed by using external light such as sunlight or indoor light. On the other hand, in a case in which the liquid crystal display device 1 is located outside or inside a room where it is dark, transmissive display is performed by using the lighting unit 4 as a backlight.

In the case of the reflective display, the external light L0, which is incident on the liquid crystal panel 2 through the color filter substrate 12 from the direction indicated by the arrow 'A' which is a viewing side, passes through the liquid crystal layer 14 to reach the element substrate 11, is then reflected from the light reflection layer 32 in the reflective display region R, and is then supplied to the liquid crystal layer 14 again. On the other hand, in the case of the transmissive display, the LEDs 6 of the lighting unit 4 are illuminated, and light emitted from the LEDs 6 is incident on the light guiding member 7 through the light incidence surface 7a of the light guiding member 7 and is then output as planar light from a light radiation surface 7b. The outgoing light is transmitted through the color filter substrate 12 to be then supplied to the liquid crystal layer 14 in the transmission display region T, as indicated by reference numeral 'L1'.

As such, while light is supplied to the liquid crystal layer 14, a predetermined voltage, which is specified by a scanning signal and a data signal, is applied between each of the pixel electrodes 21a formed at the element substrate 11 side and the common electrode 21b formed at the color filter substrate 12 side. Thus, the alignment of liquid crystal molecules within the liquid crystal layer 14 is controlled in each of the sub-pixel regions D. As a result, the light supplied to the liquid crystal layer 14 is modulated in each of the sub-pixel regions D. When the modulated light passes through the polarizer 15b provided at the color filter substrate 12 side, the modulated light is allowed or not allowed to pass through the polarizer 15b in each of the sub-pixel regions D according to the polarization characteristic of the polarizer 15b. Thus, images such as characters, numbers, and figures are displayed on the surface of the color filter substrate 12, and the images can be viewed from the direction indicated by the arrow 'A'.

Hereinafter, the peripheral region Vc will be described in detail. Referring to FIG. 3, first, a light shielding member 41b is provided over the entire peripheral region Vc on the second transmissive substrate 12a. The peripheral region Vc shown in FIG. 3 corresponds to the peripheral regions located up and down in FIG. 5. The light shielding member 41b can be formed by overlapping all of the coloring elements 42 having different colors, for example, the three colors B, G, and R or by overlapping two of the coloring elements 42 having the different colors, in the same manner as for the light shielding member 41a provided between the coloring elements 42 in a strip shape in FIG. 4. In addition, the light shielding member 41b may be formed by using a light shielding metal material, such as Cr.

Further, in FIG. 3, the second overcoat layer 43b is formed on the first overcoat layer 43a formed in the peripheral region Vc, in the same manner as in the reflective display region R within the effective display region Vi. That is, the layer thickness of a stacked structure formed on an inner surface of the color filter substrate 12 is the same in the peripheral region Vc and the reflective display region R. In addition, the second overcoat layer 43b formed in the reflective display region R and the second overcoat layer 43b formed within the peripheral region Vc can be formed at the same time by using the same material.

The second overcoat layer 43b within the peripheral region Vc has recessed portions 49. Even though the recessed portions 49 shown in FIG. 3 are formed within the peripheral regions Vc located up and down in FIG. 5, the recessed portions 49 are also formed within the peripheral regions Vc located left and right in FIG. 5. That is, the recessed portions 49 are formed over the entire peripheral regions Vc in an endless circular shape. The recessed portions 49 can be formed while the second overcoat layer 43b within the effective display region Vi is being formed in the reflective display region R by a patterning process. In the present embodiment, as shown in FIG. 6, each of the recessed portions 49 is a groove, and specifically, each of the recessed portions 49 is a slender and long cavity. In addition, in FIG. 3, the height of the recessed portion 49 is the same as that of the second overcoat layer 43b. However, if a material of the alignment layer 23b can flow into the recessed portion 49, the height of the recessed portion 49 may be smaller than that of the second overcoat layer 43b. In other words, the second overcoat layer 43b may be left on a lower portion of the recessed portion 49.

As shown in FIG. 4, photospacers 22b are formed on a part of the interlayer insulating layer 25, which does not overlap the recessed portions 49 within the peripheral region Vc, of the element substrate 11. The photospacers 22b are formed by patterning photosensitive resin by means of a photolithographic process, in the same manner as for the photospacers 22a formed within the effective display region Vi. Each of the photospacers 22a is formed to have, for example, an upright cylindrical or prismatic shape. The photospacers 22b can be formed at the same time with the photospacers 22a to be formed within the effective display region Vi. Thus, it is possible to make the thickness of the liquid crystal layer 14 uniform, even in the peripheral region Vc, by providing the photospacers 22b in the peripheral region Vc. As a result, it is possible to prevent non-uniform display due to variation in the thickness of the liquid crystal layer 14 from occurring in the vicinity of a boundary between the effective display region Vi and the peripheral region Vc.

In a conventional liquid crystal display device having no recessed portion 49 shown in FIGS. 2 and 4, when an alignment layer is formed on a color filter substrate, a material of the alignment layer coated within a peripheral region has frequently flowed into a portion lower than the peripheral region within an effective display region, that is, a transmissive display region. As a result, the thickness of the alignment layer in the effective display region becomes non-uniform and the alignment failure occurs at a portion where the alignment layer is formed thick, and accordingly, there is a possibility that the display brightness will be non-uniform.

On the other hand, in the liquid crystal display device 1 having the recessed portions 49 according to the present embodiment, when the alignment layer 23b is coated on the color filter substrate 12 in FIG. 3, the material of the alignment layer 23b coated in the peripheral region Vc can flow into the recessed portion 49. Accordingly, since it is possible to prevent the material of the alignment layer 23b from flowing excessively into the effective display region Vi shown in FIG. 6, in particular, the transmissive display region T adjacent to the peripheral region Vc, the alignment layer 23b can be uniformly coated between the effective display region Vi and the peripheral region Vc. As a result, it is possible to prevent the display brightness of the liquid crystal display device 1 from becoming non-uniform.

Second Embodiment of Electro-Optical Device

Figure 7:
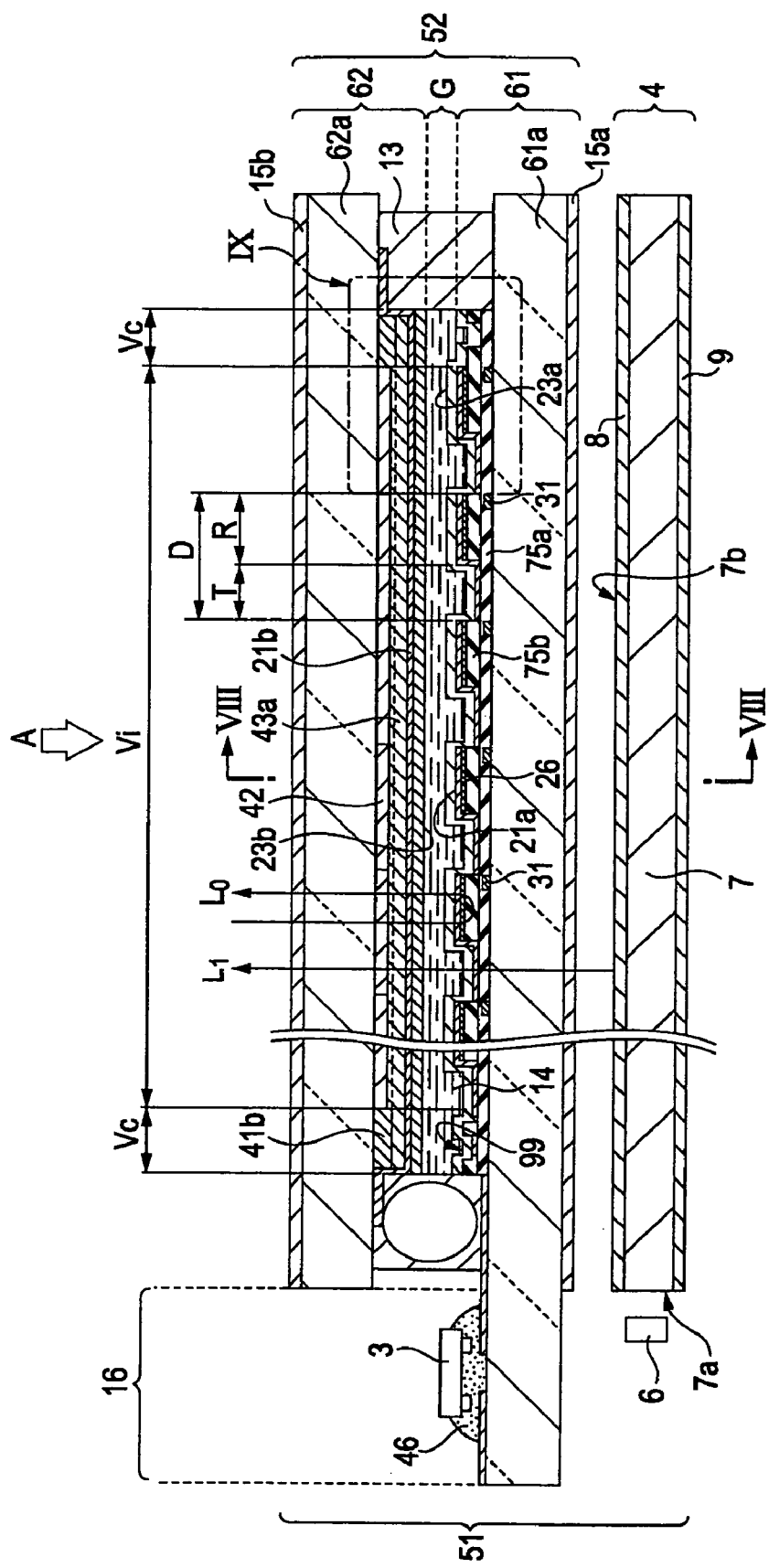
FIG. 7 is a cross-sectional view illustrating an electro-optical device according to another embodiment of the invention.
Figure 8:
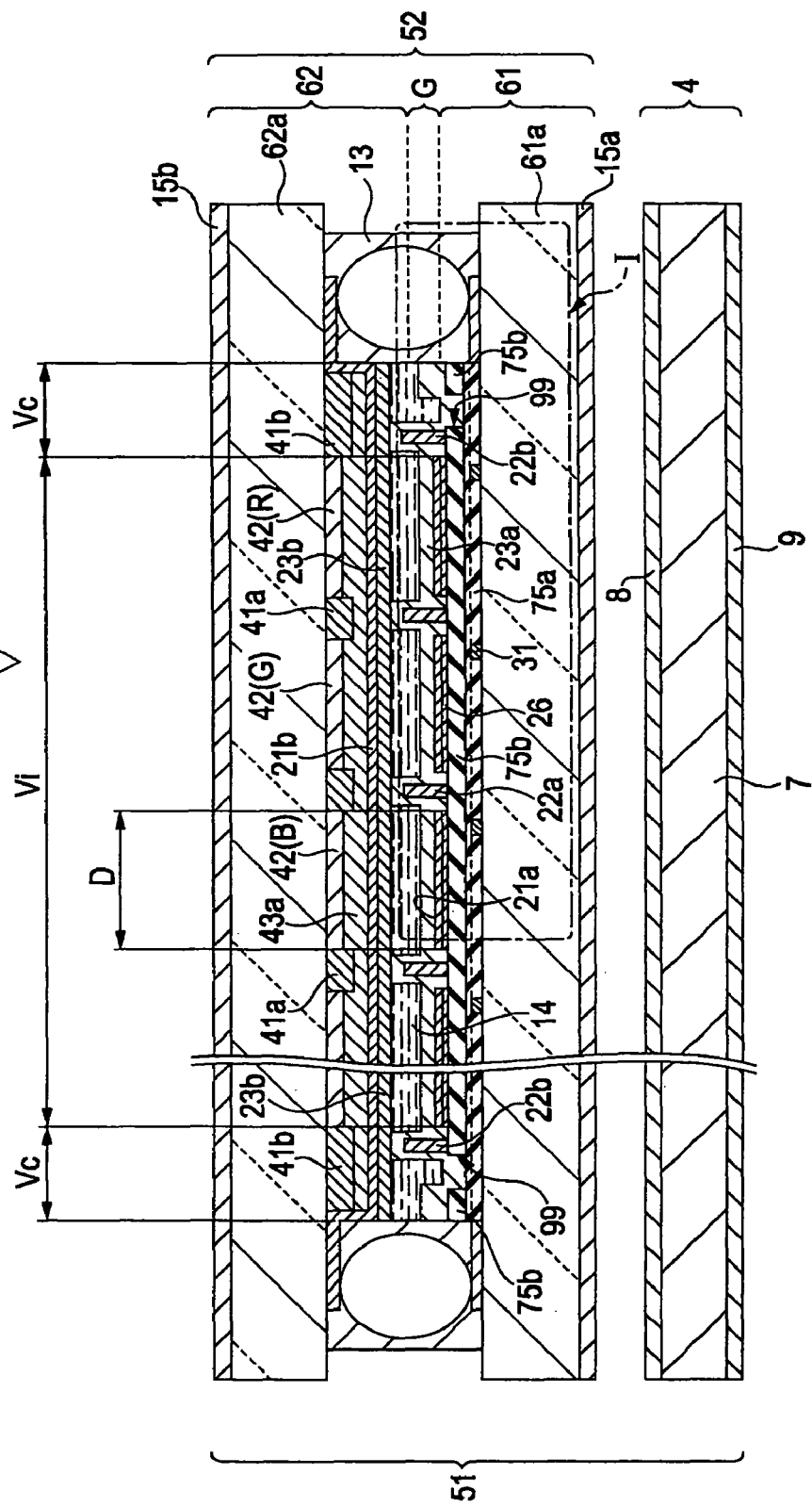
FIG. 8 is a cross-sectional view taken along the line VIII-VIII of FIG. 7.
Figure 9:
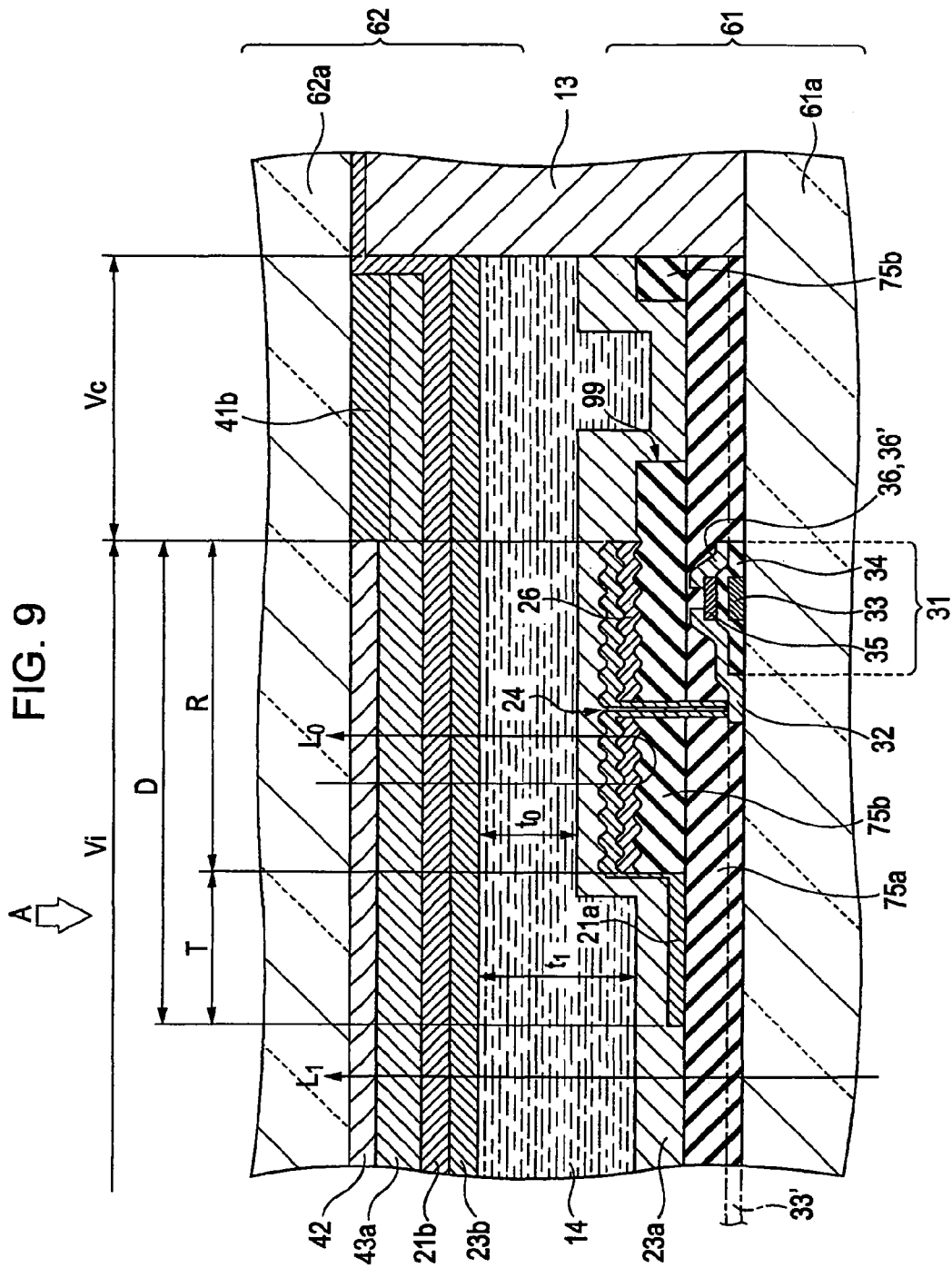
FIG. 9 is an enlarged cross-sectional view illustrating a portion indicated by an arrow 'F' of FIG. 7.
Figure 10:
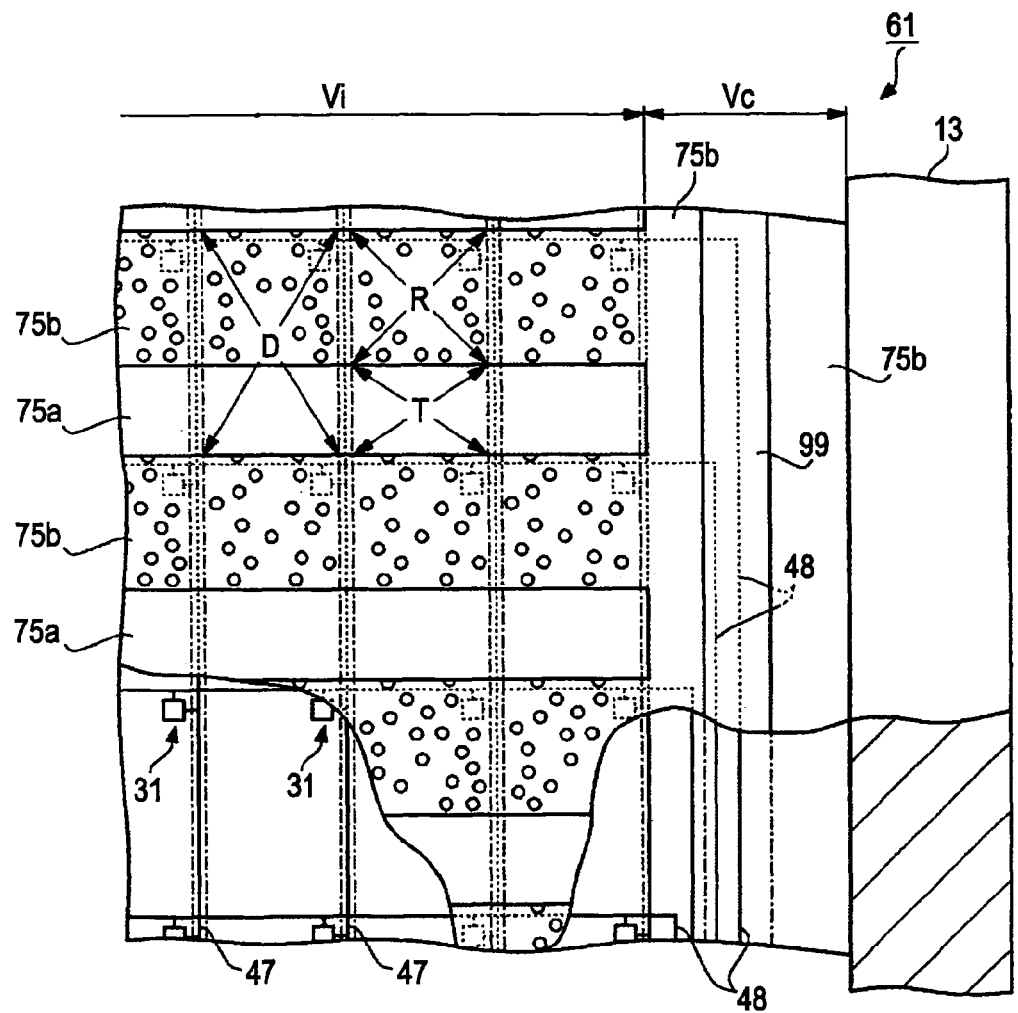
FIG. 10 is a plan view illustrating a portion indicated by an arrow 'I' of FIG. 8.

Next, a Liquid Crystal Display Device 51 which is the electro-optical device according to another embodiment of the invention will be described with reference to FIGS. 7, 8, 9, and 10. The overall configuration of the present embodiment may be equal to that shown in FIG. 1. FIG. 7 is a cross-sectional view illustrating the liquid crystal display device 51 taken along the line VII-VII in FIG. 1, in the same manner as FIG. 2 in the first embodiment described above. In addition, FIG. 8 is a cross-sectional view illustrating the liquid crystal display device 51 taken along the line VIII-VIII of FIG. 7, in the same manner as FIG. 4 in the first embodiment described above. In addition, FIG. 9 is an enlarged view illustrating a portion indicated by an arrow 'F' of FIG. 7, in the same manner as FIG. 3 in the first embodiment described above. FIG. 10 is a plan view illustrating a portion indicated by an arrow 'I' of FIG. 8 as viewed from a direction indicated by an arrow 'A' of FIG. 8, in the same manner as FIG. 6 in the first embodiment described above.

The difference between a liquid crystal panel 52 shown in FIG. 7 in the present embodiment and the liquid crystal panel 2 shown in FIG. 2 in the first embodiment is as follows. In the liquid crystal panel 2 shown in FIG. 2, the second overcoat layer 43b is formed on the first overcoat layer 43a of the color filter substrate 12, and the thickness of the liquid crystal layer 14 varies due to the second overcoat layer 43b. In addition, within the peripheral region Vc, the groove-shaped recessed portions 49 are formed on the color filter substrate 12 by means of the second overcoat layer 43b. On the other hand, in the liquid crystal panel 52 shown in FIG. 7, a second interlayer insulating layer 75b is formed on a first interlayer insulating layer 75a of an element substrate 61, and the thickness of the liquid crystal layer 14 varies by means of the second interlayer insulating layer 75b. That is, in the present embodiment, the thickness of a liquid crystal layer is adjusted by an element substrate 61 side not by a color filter substrate 62 side. In addition, within a peripheral region Vc, groove-shaped recessed portions 99 are formed on the element substrate 61 by means of the second interlayer insulating layer 75b.

Hereinafter, the second embodiment will be described focusing on the difference between the first embodiment and the second embodiment. In the following description, the same components as in the first embodiment are denoted by the same reference numerals and the description thereof is accordingly omitted.

Referring to FIG. 8, coloring elements 42 and light shielding members 41a and 41b are formed on an inner surface of a second transmissive substrate 62a forming the color filter substrate 62, a first overcoat layer 43a is formed on the coloring elements 42 and the light shielding members 41a and 41b, and an alignment layer 23b is formed on the first overcoat layer 43a. These components are the same as those in the first embodiment shown in FIG. 2 except that only one overcoat layer of the first overcoat layer 43a is formed without forming the second overcoat layer 43b shown in FIG. 4.

Referring to FIG. 7, a plurality of TFT elements 31 is formed on an inner surface of a first transmissive substrate 61a forming the element substrate 61. The first interlayer insulating layer 75a is formed so as to cover the plurality of TFT elements 31. Then, the second interlayer insulating layer 75b serving as an insulating layer is formed in a predetermined pattern, that is, on the location corresponding to a reflective display region R. As shown in FIG. 9, a light reflection layer 26 is formed on the second interlayer insulating layer 75b, and then pixel electrodes 21a are formed on the light reflection layer 26 and the first interlayer insulating layer 75a. On a surface of the second interlayer insulating layer 75b, irregularities for scattering light are formed. As a result, irregularities are also formed on the light reflection layer 26 and the pixel electrodes 21a that are located on the irregularities formed on the surface of the second interlayer insulating layer 75b. For this reason, light reflected from the light reflection layer 26 becomes scattered light.

The second interlayer insulating layer 75b serves to adjust the thickness of the liquid crystal layer 14 between the reflective display region R and the transmissive display region T. Specifically, the second interlayer insulating layer 75b having a predetermined thickness is provided in the reflective display region R where the light reflection layer 26 is formed. For this reason, the thickness t0 of the liquid crystal layer 14 corresponding to the reflective display region R is set to be small. On the other hand, the second interlayer insulating layer 75b is not provided in the transmissive display region T where the light reflection layer 26 is not formed. That is, only the first interlayer insulating layer 75a is provided in the transmissive display region T. For this reason, the thickness t1 of the liquid crystal layer 14 corresponding to the transmissive display region T is set to be larger than the thickness t0 of the liquid crystal layer 14 corresponding to the reflective display region R, that is, t1>t0. Thus, it is possible to make the lengths of optical paths of reflected light L0 and transmissive light L1, which pass through the liquid crystal layer 14, equal or approximated to each other. As a result, it is possible to perform display having uniform concentration between the reflective display and the transmissive display.

Further, in the embodiment shown in FIG. 3, the second interlayer insulating layer 75b is not provided in the transmissive display region T, that is, the thickness of the second interlayer insulating layer 75b is set to zero. However, as long as the thickness of the second interlayer insulating layer 75b satisfies the condition of t1>t0, the thickness of the second interlayer insulating layer 75b in the transmissive display region T is not limited to zero. In addition, in the present embodiment, even though two interlayer insulating layers, that is, the first interlayer insulating layer 75a and the second interlayer insulating layer 75b are provided, it is possible to provide only one overcoat layer as long as the thickness of the liquid crystal layer 14 satisfies the condition of t1>t0. In other words, by setting the thickness of an interlayer insulating layer in the transmissive display region T to be smaller than that in the reflective display region R, it is possible to make the thickness of the liquid crystal layer 14 corresponding to the reflective display region R smaller than the thickness of the liquid crystal layer 14 corresponding to the transmissive display region T.

Referring to FIG. 8, a plurality of photospacers 22a serving as spacer members is formed at predetermined distances in a region (that is, light shielding region or black mask region) between the pixel electrodes 21a, which are adjacent to each other, on the second interlayer insulating layer 75b. The alignment layer 23a is formed on the pixel electrodes 21a and the photospacers 22a. In addition, for example, the alignment layer 23a is subjected to a rubbing process. Thus, the initial alignment of liquid crystal molecules in the vicinity of the alignment layer 23b is determined.

Referring to FIG. 9, the second interlayer insulating layer 75b is formed on the first interlayer insulating layer 75a formed in the peripheral region Vc, in the same manner as in the reflective display region R within the effective display region Vi. That is, the layer thickness of a stacked structure formed on an inner surface of the element substrate 61 is the same in the peripheral region Vc and the reflective display region R. In addition, the second interlayer insulating layer 75b formed in the reflective display region R and the second interlayer insulating layer 75b formed within the peripheral region Vc can be formed at the same time by using the same material.

The second interlayer insulating layer 75b within the peripheral region Vc has recessed portions 99. The recessed portions 99 can be formed while the second interlayer insulating layer 75b within the effective display region Vi is being formed in the reflective display region R by a patterning process. In the present embodiment, as shown in FIG. 10, each of the recessed portions 99 is a groove, and specifically, each of the recessed portions 49 is a slender and long cavity and is formed over the peripheral region Vc that surrounds the entire circumference of the effective display region Vi. In addition, in FIG. 9, the height of the recessed portion 99 is the same as that of the second interlayer insulating layer 75b. However, if a material of the alignment layer 23a can flow into the recessed portion 99, the height of the recessed portion 99 may be smaller than that of the second interlayer insulating layer 75b. In other words, the second interlayer insulating layer 75b may be left on a lower portion of the recessed portion 99.

As shown in FIG. 8, photospacers 22b are formed on a part of the second interlayer insulating layer 75b, which does not overlap the recessed portions 99 within the peripheral region Vc. The photospacers 22b can be formed at the same time as the photospacers 22a are formed within the effective display region Vi. Thus, it is possible to make the thickness of the liquid crystal layer 14 uniform even in the peripheral region Vc by providing the photospacers 22b in the peripheral region Vc. As a result, it is possible to prevent non-uniform display due to variation in the thickness of the liquid crystal layer 14 from occurring in the vicinity of a boundary between the effective display region Vi and the peripheral region Vc.

Further, in the liquid crystal display device 51, the recessed portions 99 are formed in the peripheral region Vc. For this reason, when the alignment layer 23a is coated on the element substrate 61 in FIG. 9, the material of the alignment layer 23a coated in the peripheral region Vc can flow into the recessed portion 99. Accordingly, since it is possible to prevent the material of the alignment layer 23a from flowing excessively into the effective display region Vi shown in FIG. 10, in particular, the transmissive display region T adjacent to the peripheral region Vc, the alignment layer 23a can be uniformly coated between the effective display region Vi and the peripheral region Vc. As a result, it is possible to prevent the display brightness of the liquid crystal display device 51 from becoming non-uniform.

Other Embodiments of Electro-Optical Device

While the invention has been described with reference to the above-mentioned embodiments, it should be understood that the invention is not limited to those embodiments but various changes and modifications thereof can be made without departing from the spirit or scope of the invention as defined in the appended claims.

Figure 11A:
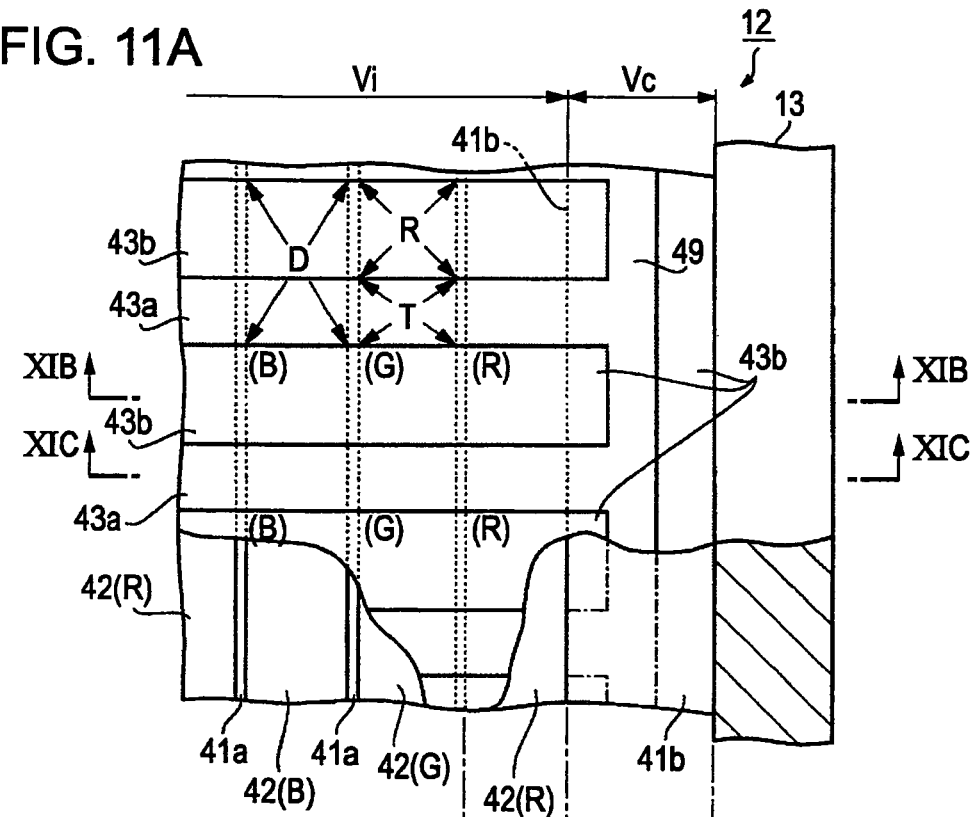
FIG. 11A is a plan view illustrating another example of the portion indicated by the arrow 'H' of FIG. 4.
Figure 11B:
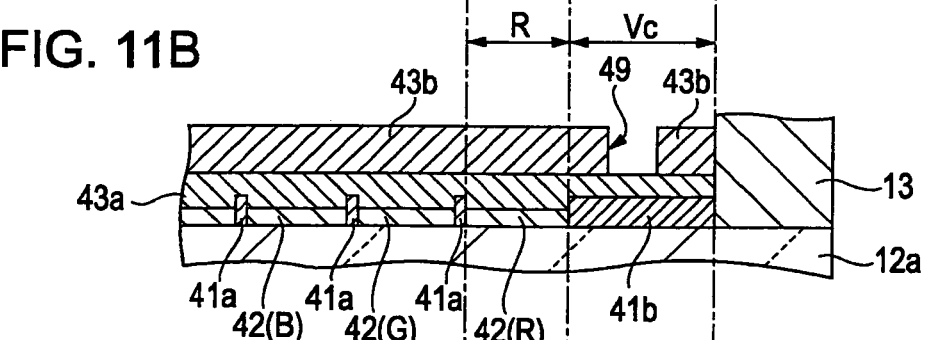
FIG. 11B is a cross-sectional view taken along the line XIB-XIB of FIG. 11A.

For example, in the present embodiment, referring to FIG. 6, the recessed portion 49 is a groove, that is, a slender and long cavity, and the recessed portion 49 and the transmissive display region T are spaced apart from each other by the second overcoat layer 43b. However, as shown in FIG. 11A, the recessed portion 49 may be formed to be connected to the transmissive display region T adjacent to the peripheral region Vc. In this case, as shown in FIG. 11B, on a cross section taken along the line XIB-XIB of FIG. 11A, that is, on a cross section of a portion where the peripheral region Vc and the reflective display region R are adjacent to each other, the recessed portion 49 is formed in a groove shape in the second overcoat layer 43b within the peripheral region Vc, in the same manner as in FIG. 4.

Figure 11C:
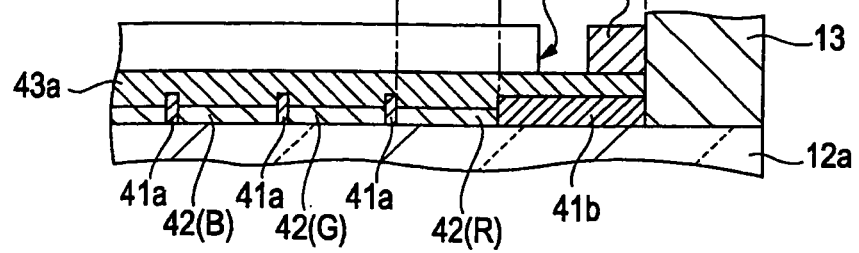
FIG. 11C is a cross-sectional view taken along the line XIC-XIC of FIG. 11A.

On the other hand, as shown in FIG. 11C, on a cross section taken along the line XIC-XIC of FIG. 11A, that is, on a cross section of a portion where the peripheral region Vc and the transmissive display region T are adjacent to each other, the second overcoat layer 43b is formed only at a portion adjacent to the sealant 13 but is not formed at a portion adjacent to the transmissive display region T. Accordingly, a lower surface of the recessed portion 49 and the transmissive display region T have the same heights. Thus, it is possible to eliminate a portion where the thickness of the second overcoat layer 43b changes abruptly between the transmissive display region T and the peripheral region Vc. As a result, it is possible to prevent a layer formed on the second overcoat layer 43b between the transmissive display region T and the peripheral region Vc, for example, the common electrode 21b from being broken.

Figure 12A:
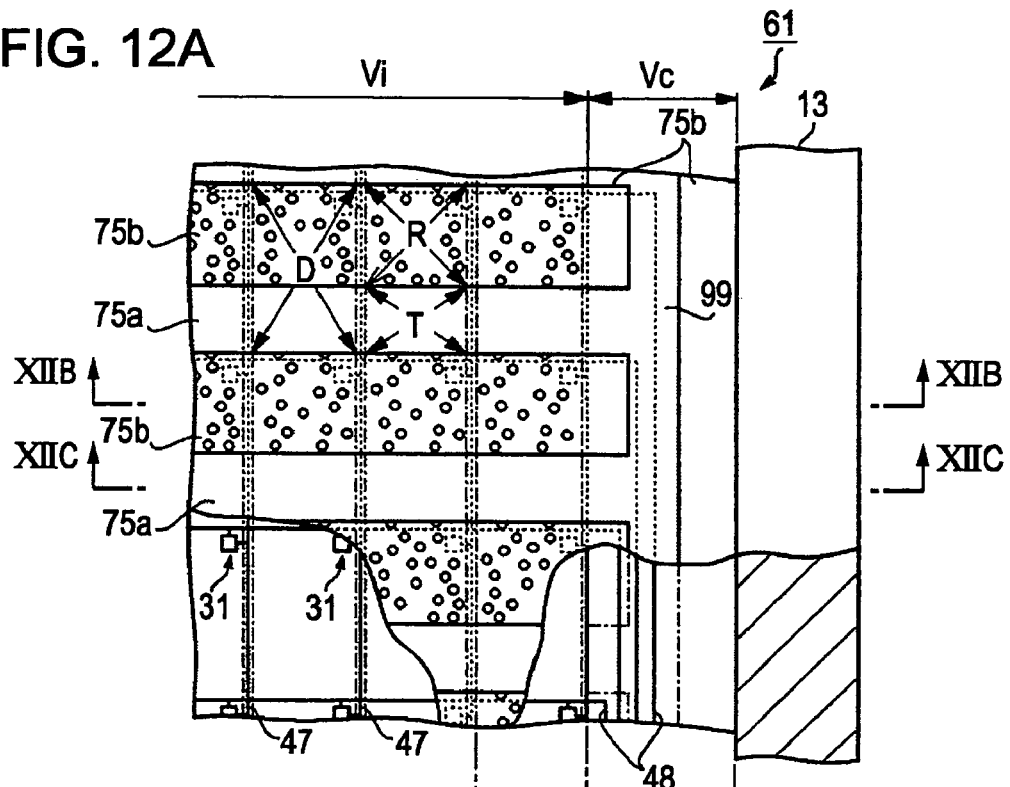
FIG. 12A is a plan view illustrating another example of the portion indicated by the arrow 'I' of FIG. 8.
Figure 12B:
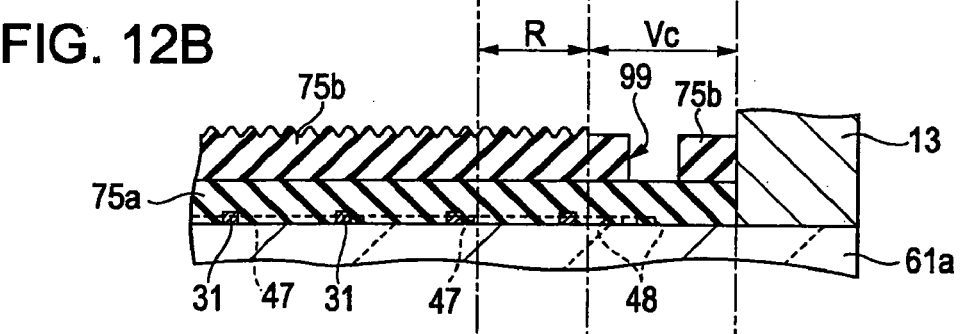
FIG. 12B is a cross-sectional view taken along the line XIIB-XIIB of FIG. 12A.

In addition, referring to FIG. 10, the recessed portion 99 is a groove, that is, a slender and long cavity, and the recessed portion 99 and the transmissive display region T are spaced apart from each other by the second interlayer insulating layer 75b. However, as shown in FIG. 12A, the recessed portion 99 may be formed to be connected to the transmissive display region T adjacent to the peripheral region Vc. In this case, as shown in FIG. 12B, on a cross section taken along the line XIIB-XIIB of FIG. 12A, that is, on a cross section of a portion where the peripheral region Vc and the reflective display region R are adjacent to each other, the recessed portion 99 is formed in a groove shape in the second interlayer insulating layer 75b within the peripheral region Vc, in the same manner as in FIG. 8.

Figure 12C:
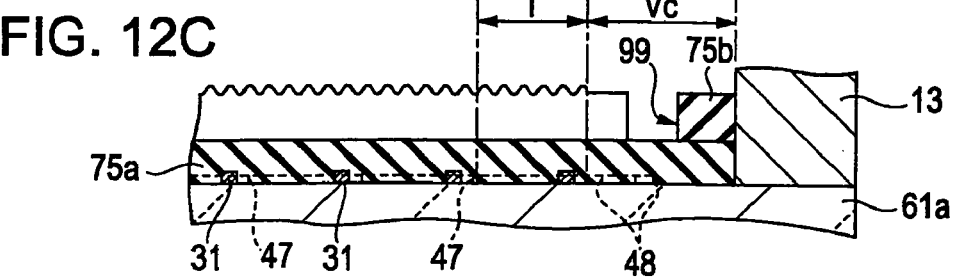
FIG. 12C is a cross-sectional view taken along the line XIIC-XIIC of FIG. 12A.

On the other hand, as shown in FIG. 12C, on a cross section taken along the line XIIC-XIIC of FIG. 12A, that is, on a cross section of a portion where the peripheral region Vc and the transmissive display region T are adjacent to each other, the second interlayer insulating layer 75b is formed at a portion adjacent to the sealant 13 but is not formed at a portion adjacent to the transmissive display region T. Accordingly, a lower surface of the recessed portion 99 and the transmissive display region T have the same heights. Thus, it is possible to eliminate a portion where the thickness of the second interlayer insulating layer 75b changes abruptly between the transmissive display region T and the peripheral region Vc. As a result, it is possible to prevent a layer formed on the second interlayer insulating layer 75b between the transmissive display region T and the peripheral region Vc from being broken.

Figure 13A:
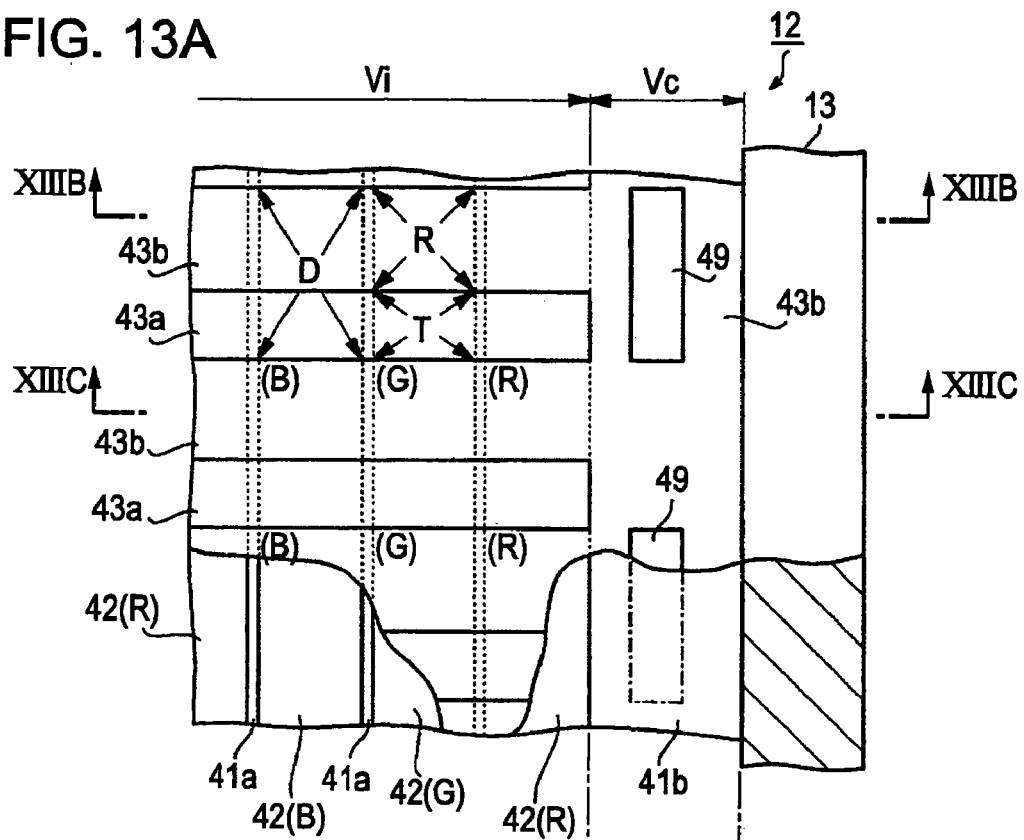
FIG. 13A is a plan view illustrating still another example of the portion indicated by the arrow 'H' of FIG. 4.
Figure 13B:
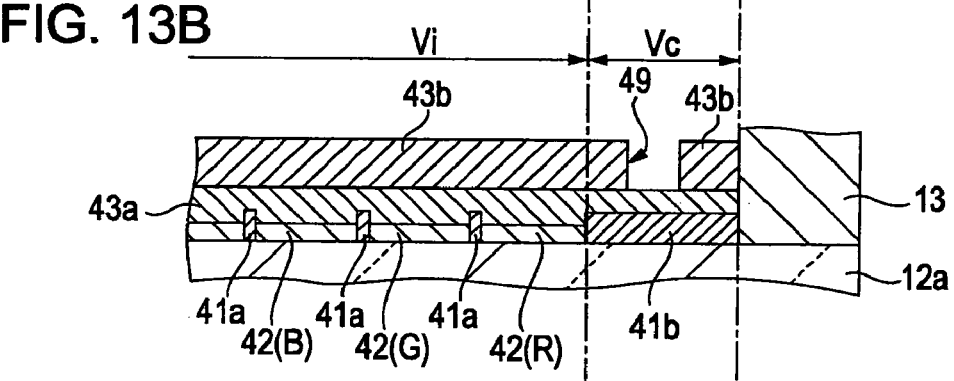
FIG. 13B is a cross-sectional view taken along the line XIIIB-XIIIB of FIG. 13A.
Figure 13C:
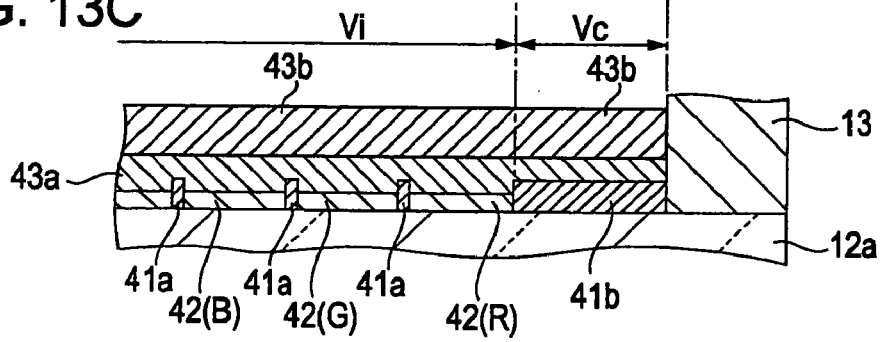
FIG. 13C is a cross-sectional view taken along the line XIIIC-XIIIC of FIG. 13A.

Further, referring to FIG. 6, the recessed portions 49 are formed in a circular shape over the entire peripheral region Vc surrounding the effective display region Vi. However, as shown in FIG. 13A, the recessed portions 49 may be formed as discontinuous grooves and not as the circular shaped portions. In this case, as shown in FIG. 13B, on a cross section taken along the line XIIIB-XIIIB of FIG. 13A, the recessed portion 49 is formed in a groove shape in the second overcoat layer 43b within the peripheral region Vc, in the same manner as in FIG. 4. On the other hand, as shown in FIG. 13C, on a cross section taken along the line XIIIC-XIIIC of FIG. 13A, the second overcoat layer 43b is formed in the same height over the peripheral region Vc and the effective display region Vi without forming the recessed portions 49.

Figure 14A:
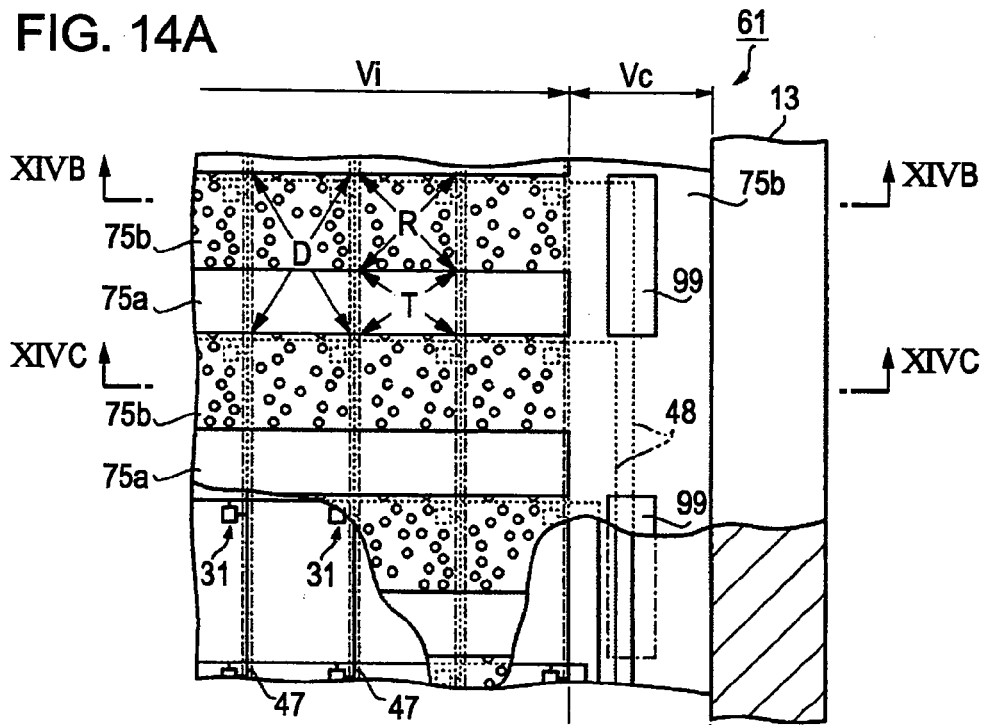
FIG. 14A is a plan view illustrating still another example of the portion indicated by the arrow 'I' of FIG. 8.
Figure 14B:
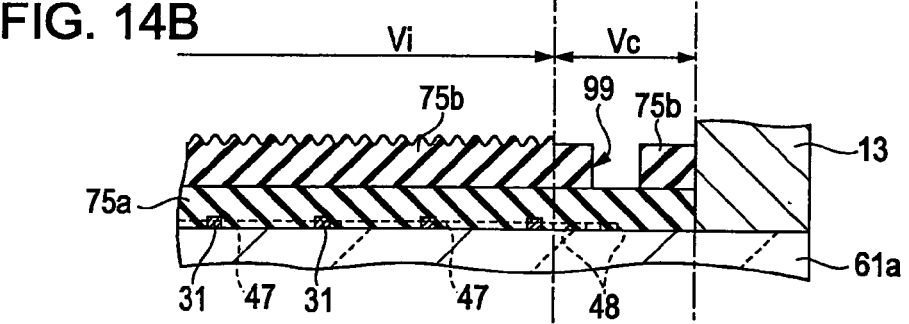
FIG. 14B is a cross-sectional view taken along the line XIVB-XIVB of FIG. 14A.
Figure 14C:
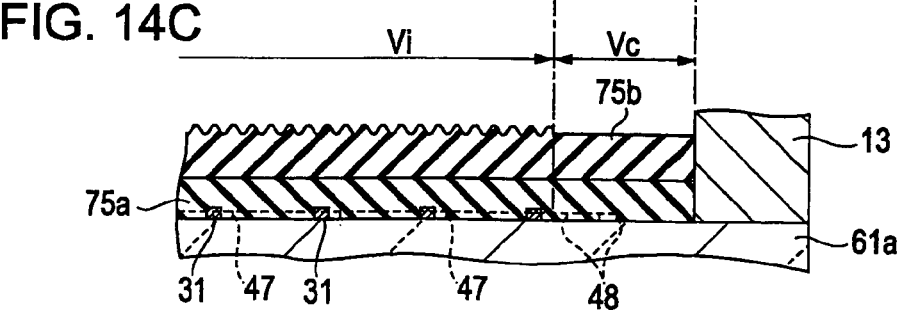
FIG. 14C is a cross-sectional view taken along the line XIVC-XIVC of FIG. 14A.

Further, referring to FIG. 10, the recessed portions 99 are formed in a circular shape over the entire peripheral region Vc surrounding the effective display region Vi. However, as shown in FIG. 14A, the recessed portions 99 may be formed as discontinuous grooves and not as the circular shaped portions. In this case, as shown in FIG. 14B, on a cross section taken along the line XIVB-XIVB of FIG. 14A, the recessed portion 99 is formed in a groove shape in the second interlayer insulating layer 75b within the peripheral region Vc, in the same manner as in FIG. 8. On the other hand, as shown in FIG. 14C, on a cross section taken along the line XIVC-XIVC of FIG. 14A, the second interlayer insulating layer 75b is formed in the same height over the peripheral region Vc and the effective display region Vi without forming the recessed portions 99.

First Embodiment of Method of Manufacturing Electro-Optical Device

Hereinafter, a method of manufacturing an electro-optical device according to an embodiment of the invention will be described by using a case of manufacturing the liquid crystal display device 1 shown in FIG. 2 as an example. FIG. 15 is a flow chart illustrating processes of a method of manufacturing the liquid crystal display device 1 according to an embodiment of the invention. In FIG. 15, processes P1 to P8 are processes of forming the element substrate 11 in FIG. 2. In addition, processes P11 to P16 in FIG. 15 are processes of forming the color filter substrate 12 in FIG. 2. In addition, processes P21 to P28 in FIG. 15 are processes of forming a liquid crystal display device by bonding the element substrate 11 and the color filter substrate 12.

Further, in the present embodiment, a plurality of element substrates 11 is formed at the same time on an element substrate-side transmissive mother board having enough area to form elements corresponding to the plurality of element substrates 11, and a plurality of color filter substrates 12 is formed at the same time on a color filter-side transmissive mother board having enough area to form elements corresponding to the plurality of color filter substrates 12, without forming only one element substrate 11 and only one color filter substrate 12 which are shown in FIG. 2. Each of the element substrate-side transmissive mother board and the color filter-side transmissive mother board is formed of, for example, a transparent glass, a transmissive plastic, or the like.

First, in the process P1 of FIG. 15, the TFT elements 31 shown in FIG. 2 are formed in a predetermined stacked structure, that is, the stacked structure shown in FIG. 3 by using a photo-etching process, for example. At the same time, the wiring lines 47 and 48 and the terminals 44 shown in FIG. 5 are formed in a predetermined pattern. Then, in the process P2 of FIG. 15, the interlayer insulating layer 25 shown in FIG. 2 is formed on the first transmissive substrate 11a by using a positive-type photosensitive resin material, for example. At this time, as shown in FIG. 3, the contact holes 24 and the irregularities are formed in predetermined places of the interlayer insulating layer 25 by means of a photolithographic process.

Subsequently, in the process P3 of FIG. 15, the light reflection layer 26 shown in FIG. 3 is formed of Al or an Al alloy by means of the photo-etching process, for example. At this time, in a part of the surface of the interlayer insulating layer 25 where the irregularities are formed, the light reflection layer 26 formed thereon is also formed with the same irregularities. In addition, when light is reflected from the light reflection layer 26, the reflected light becomes scattered light.

Thereafter, in the process P4 of FIG. 15, the pixel electrodes 21a made of ITO are formed in a predetermined shape by means of a photo-etching process so as to overlap the TFT elements 31 shown in FIG. 3 in plan view. Then, in the process P5 of FIG. 15, the photospacers 22a and 22b shown in FIG. 4 are formed of a negative-type photosensitive resin material by means of the photolithographic process, and in the process P6 of FIG. 15, the alignment layer 23a shown in FIG. 4 is formed of a photosensitive resin material, such as polyimide, by means of the photolithographic process. Then, in the process P7 of FIG. 15, the alignment layer 23a shown in FIG. 4 is subjected to the rubbing process so as to apply the orientation characteristic thereto. Then, in the process P8 of FIG. 15, the sealant 13 shown in FIG. 4 is formed of epoxy-based resin by means of a printing method. As such, the elements corresponding to the plurality of element substrates 11 are formed on the large-sized transmissive mother board for element substrates, thereby forming a large-sized mother board at the element substrate 11 side.

On the other hand, in the process P11 of FIG. 15, the coloring elements 42 shown in FIG. 4 are sequentially formed on the large-sized transmissive mother board at the element substrate 11 side for each of the colors B, G, and R. These coloring elements 42 are formed in a predetermined arrangement by using a coloring material, which is obtained by, for example, diffusing pigment or dye having each of the colors in photosensitive resin, by means of the photolithographic process. At this time, by stacking the two coloring elements 42, which are adjacent to each other and have different colors, at the same time or by stacking all of the coloring elements 42 corresponding to the three colors, the light shielding members 41a are formed in a predetermined pattern between the coloring elements 42 having different colors. In the present embodiment, the coloring elements 42 are formed in a strip pattern in which the sub-pixel region D is interposed between the coloring elements 42 having the different colors. In addition, the light shielding members 41a are formed over the entire peripheral region Vc. In addition, the light shielding members 41a and 41b may be formed in a predetermined pattern by using a light shielding metal material, such as Cr, by means of the photo-etching process.

Thereafter, in the process P12 of FIG. 15, the first overcoat layer 43a is formed on the light shielding members 41a and 41b and the coloring elements 42 shown in FIG. 4 by using a photosensitive resin material, such as acrylic resin or polyimide resin, by means of the photolithographic process. Then, in the process P13 of FIG. 15, the second overcoat layer 43a is formed on the first overcoat layer 43a shown in FIG. 2 in a predetermined pattern by using a photosensitive resin material, such as acrylic resin or polyimide resin, by means of the photolithographic process. During this patterning process, in the effective display region Vi, the second overcoat layer 43b is formed in the predetermined pattern at the position corresponding to the reflective display region R within the sub-pixel region D, and in the peripheral region Vc, the recessed portion 49 to which the material of the alignment layer flows is formed within the second overcoat layer 43b.

Subsequently, in the process P14 of FIG. 15, the common electrode 21b shown in FIG. 2 is formed of ITO by means of the photo-etching process. Then, in the process P15 of FIG. 15, the alignment layer 23b shown in FIG. 2 is formed of a photosensitive resin material, such as polyimide, by means of the photolithographic process, and in the process P16 of FIG. 15, a rubbing process that is an alignment process is performed on the surface of the alignment layer 23b shown in FIG. 2. As such, elements corresponding to the plurality of color filter substrates 12 are formed on the large-sized transmissive mother board at the color filter side, thereby forming a large-sized mother board at the color filter substrate 12 side.

Then, in the process P21 of FIG. 15, the element substrate-side mother board and the color filter-side mother board are bonded to each other. As a result, a large-sized panel structure is formed in which the element substrate-side mother board and the color filter-side mother board are bonded to each other with the sealant 13 shown in FIG. 2 interposed in a region of each liquid crystal display device.

Thereafter, the element substrate-side mother board and the color filter-side mother board are bonded to each other by heat-curing the sealant 13 included in the large-sized panel structure in the process P22 of FIG. 15, thereby forming the large-sized panel structure. Then, in the process P23, the panel structure is first cut, that is, first broken, such that a plurality of medium-sized panel structures where the plurality of liquid crystal panels 2 shown in FIG. 1 is arranged in a row, that is, a plurality of strip-shaped panel structures is formed. Furthermore, the liquid crystal injection hole 13a is formed beforehand at a predetermined location, and if the strip-shape panel structure is formed by the first breaking process, the liquid crystal injection hole 13a of the sealant 13 is exposed to the outside.

Then, in the process P24 of FIG. 15, liquid crystal is injected inside the liquid crystal panel through the liquid crystal injection hole 13a of the sealant 13, and after the injection is completed, the liquid crystal injection hole 13a is sealed with resin. Then, in the process P25, a second cutting, that is, a second breaking is performed, and then each liquid crystal panel 2 shown in FIG. 1 is cut away from the strip-shaped panel structure.

Then, in the process P26 of FIG. 15, the driving ICs 3 shown in FIG. 1 are mounted by using the ACF 46 by means of a thermocompression bonding process. Then, in the process P27 of FIG. 15, the polarizers 15a and 15b are mounted on the liquid crystal panel 2 shown in FIG. 2 by a bonding process. In addition, in the process P28 shown in FIG. 15, the lighting unit 4 shown in FIG. 2 is attached to the liquid crystal panel 52. Thus, the liquid crystal display device 1 is completed.

As described above, in the method of manufacturing the liquid crystal display device according to the embodiment, as shown in FIG. 3, in the process P13 of FIG. 15, the recessed portions 49 are formed in the second overcoat layer 43b on the color filter substrate 12 within the peripheral region Vc. For this reason, in the process P15 of FIG. 15, when the material of the alignment layer 23b is coated on the color filter substrate 12 in FIG. 3, the material of the alignment layer 23b coated in the peripheral region Vc can flow into the recessed portions 49. Accordingly, since it is possible to prevent the material of the alignment layer 23b from flowing excessively into the effective display region Vi, in particular, the transmissive display region T adjacent to the peripheral region Vc, the alignment layer 23b can be uniformly coated between the effective display region Vi and the peripheral region Vc. As a result, it is possible to prevent the display brightness of the liquid crystal display device 1 from becoming non-uniform.

Second Embodiment of Method of Manufacturing Electro-Optical Device

Next, a method of manufacturing an electro-optical device according to another embodiment of the invention will be described with reference to FIG. 16. In the present embodiment, the liquid crystal display device 51 having the structure shown in FIG. 7 is manufactured. In addition, the entire construction of the liquid crystal display device 51 is the same as the liquid crystal display device 1 shown in FIG. 1 except for the construction of the liquid crystal panel 52.

Referring to FIG. 16, processes P31 to P39 are processes of forming the element substrate 61 in FIG. 7. In addition, processes P41 to P45 in FIG. 16 are processes of forming the color filter substrate 62 in FIG. 2. In addition, processes P51 to P58 in FIG. 15 are processes of forming a liquid crystal display device by bonding the element substrate 61 and the color filter substrate 62.

Even in the present embodiment, in the same manner as in the embodiment shown in FIG. 15, a plurality of element substrates 61 is formed at the same time on an element substrate-side transmissive mother board having enough area to form elements corresponding to the plurality of element substrates 61, and a plurality of color filter substrates 62 is formed at the same time on a color filter-side transmissive mother board having enough area to form elements corresponding to the plurality of color filter substrates 62, without forming only one element substrate 61 and only one color filter substrate 62 which are shown in FIG. 7. Each of the element substrate-side transmissive mother board and the color filter-side transmissive mother board is formed of, for example, a transparent glass, a transmissive plastic, or the like.

First, in the process P31 of FIG. 16, the TFT elements 31 shown in FIG. 9 are formed in a predetermined stacked structure by using a photo-etching process, for example. Then, in the process P32 of FIG. 16, the first interlayer insulating layer 75a shown in FIG. 9 is formed on the first transmissive substrate 61a by using a positive-type photosensitive resin material, for example. Then, in the process P33 of FIG. 16, the second interlayer insulating layer 75b is formed on the first interlayer insulating layer 75a in FIG. 9 in a predetermined pattern by using a positive-type photosensitive resin material, for example. In the present embodiment, within the effective display region Vi, the second interlayer insulating layer 75b is formed at the position corresponding to the reflective display region R within the sub-pixel region D, and in the peripheral region Vc, the recessed portion 99 to which the material of the alignment layer 23b flows is formed. At this time, the irregularities are formed in predetermined places of the second interlayer insulating layer 75 by means of a photolithographic process. At the same time, the contact holes 24 that pass through the first interlayer insulating layer 75a and the second interlayer insulating layer 75b are also formed.

Subsequently, in the process P34 of FIG. 16, the light reflection layer 26 shown in FIG. 9 is formed of Al or an Al alloy by means of the photo-etching process, for example. At this time, in a part of the surface of the second interlayer insulating layer 75b where the irregularities are formed, the light reflection layer 26 formed thereon is also formed with the same irregularities. In addition, when light is reflected from the light reflection layer 26, the reflected light becomes scattered light.

Thereafter, in the process P35 of FIG. 16, the pixel electrodes 21a made of ITO are formed in a predetermined shape by means of a photo-etching process so as to overlap the TFT elements 31 shown in FIG. 9 in plan view. Then, in the process P36 of FIG. 16, the photospacers 22a and 22b shown in FIG. 8 are formed of a negative-type photosensitive resin material by means of the photolithographic process, and in the process P37 of FIG. 16, the alignment layer 23a shown in FIG. 8 is formed of a photosensitive resin material, such as polyimide, by means of the photolithographic process. Then, in the process P38 of FIG. 16, the alignment layer 23a shown in FIG. 8 is subjected to the rubbing process so as to apply the orientation characteristic thereto. Then, in the process P39 of FIG. 16, the sealant 13 shown in FIG. 8 is formed of epoxy-based resin by means of a printing method. As such, the elements corresponding to the plurality of element substrates 61 are formed on the large-sized transmissive mother board for element substrates, thereby forming a large-sized mother board at the element substrate 61 side.

On the other hand, in the process P41 of FIG. 16, the coloring elements 42 shown in FIG. 8 are sequentially formed on the large-sized transmissive mother board at the element substrate 61 side for each of the colors B, G, and R. These coloring elements 42 are formed in a predetermined arrangement by using a coloring material, which is obtained by, for example, diffusing pigment or dye having each of the colors in photosensitive resin, by means of the photolithographic process. At this time, by stacking the two coloring elements 42, which are adjacent to each other and have different colors, at the same time or by stacking all of the coloring elements 42 corresponding to the three colors, the light shielding members 41a and 41b are formed in a predetermined pattern between the coloring elements 42 having different colors. In the present embodiment, the coloring elements 42 are formed in a strip pattern in which the sub-pixel region D is interposed between the coloring elements 42 having the different colors. In addition, the light shielding members 41a and 41b may be formed in a predetermined pattern by using a light shielding metal material, such as Cr, by means of the photo-etching process.

Thereafter, in the process P42 of FIG. 16, the overcoat layer 43a is formed on the light shielding members 41a and 41b and the coloring elements 42 shown in FIG. 8 by using a photosensitive resin material, such as acrylic resin or polyimide resin, by means of the photolithographic process. Then, in the process P43 of FIG. 16, the common electrode 21b shown in FIG. 7 is formed of ITO by means of the photo-etching process. Then, in the process P44 of FIG. 16, the alignment layer 23b shown in FIG. 7 is formed by using a photosensitive resin material, such as polyimide resin, by means of the photolithographic process, and in the process P45 of FIG. 16, a rubbing process that is an alignment process is performed on the surface of the alignment layer 23b shown in FIG. 7. As such, elements corresponding to the plurality of color filter substrates 62 are formed on the large-sized transmissive mother board at the color filter side, thereby forming a large-sized mother board at the color filter substrate 62 side.

Then, in the process P51 of FIG. 16, the element substrate-side mother board and the color filter-side mother board are bonded to each other. As a result, a large-sized panel structure is formed in which the element substrate-side mother board and the color filter-side mother board are bonded to each other by the sealant 13 shown in FIG. 7 interposed therebetween in a region of each liquid crystal display device.

Thereafter, the element substrate-side mother board and the color filter-side mother board are bonded to each other by heat-curing the sealant 13 included in the large-sized panel structure in the process P52 of FIG. 16, thereby forming the large-sized panel structure. Then, in the process P53, the panel structure is first cut, that is, first broken, such that a plurality of medium-sized panel structures where the plurality of liquid crystal panels 52 shown in FIG. 7 is arranged in a row, that is, a plurality of strip-shaped panel structures is formed. Furthermore, the liquid crystal injection hole 13a is formed beforehand at a predetermined location, and if the strip-shaped panel structure is formed by the first breaking process, the liquid crystal injection hole 13a of the sealant 13 is exposed to the outside.

Then, in the process P54 of FIG. 16, liquid crystal is injected inside the liquid crystal panel through the liquid crystal injection hole 13a of the sealant 13, and after the injection is completed, the liquid crystal injection hole 13a is sealed with resin. Then, in the process P55, a second cutting, that is, a second breaking is performed, and then each liquid crystal panel 52 shown in FIG. 7 is cut away from the strip-shaped panel structure.

Then, in the process P56 of FIG. 16, the driving ICs 3 shown in FIG. 7 are mounted by using the ACF 46 by means of a thermocompression bonding process. Then, in the process P57 of FIG. 16, the polarizers 15a and 15b are mounted on the liquid crystal panel 52 shown in FIG. 7 by a bonding process. In addition, in the process P58 shown in FIG. 16, the lighting unit 4 shown in FIG. 7 is attached to the liquid crystal panel 52. Thus, the liquid crystal display device 51 is completed.

As described above, in the method of manufacturing the liquid crystal display device according to the embodiment, as shown in FIG. 9, in the process P33 of FIG. 16, the recessed portions 99 are formed in the second interlayer insulating layer 75b on the element substrate 61 within the peripheral region Vc. For this reason, in the process P37 of FIG. 16, when the alignment layer 23a is coated on the element substrate 61 in FIG. 9, the material of the alignment layer 23a coated in the peripheral region Vc can flow into the recessed portions 99. Accordingly, since it is possible to prevent the material of the alignment layer 23a from flowing excessively into the effective display region Vi, in particular, the transmissive display region T adjacent to the peripheral region Vc, the alignment layer 23a can be uniformly coated between the effective display region Vi and the peripheral region Vc. As a result, it is possible to prevent the display brightness of the liquid crystal display device 51 from becoming non-uniform.

Embodiments of Electronic Apparatus

Hereinafter, an electronic apparatus of the invention will be described in conjunction with a preferred embodiment. In addition, these embodiments are only examples of the invention, but the invention is not limited to these embodiments.

Figure 17:
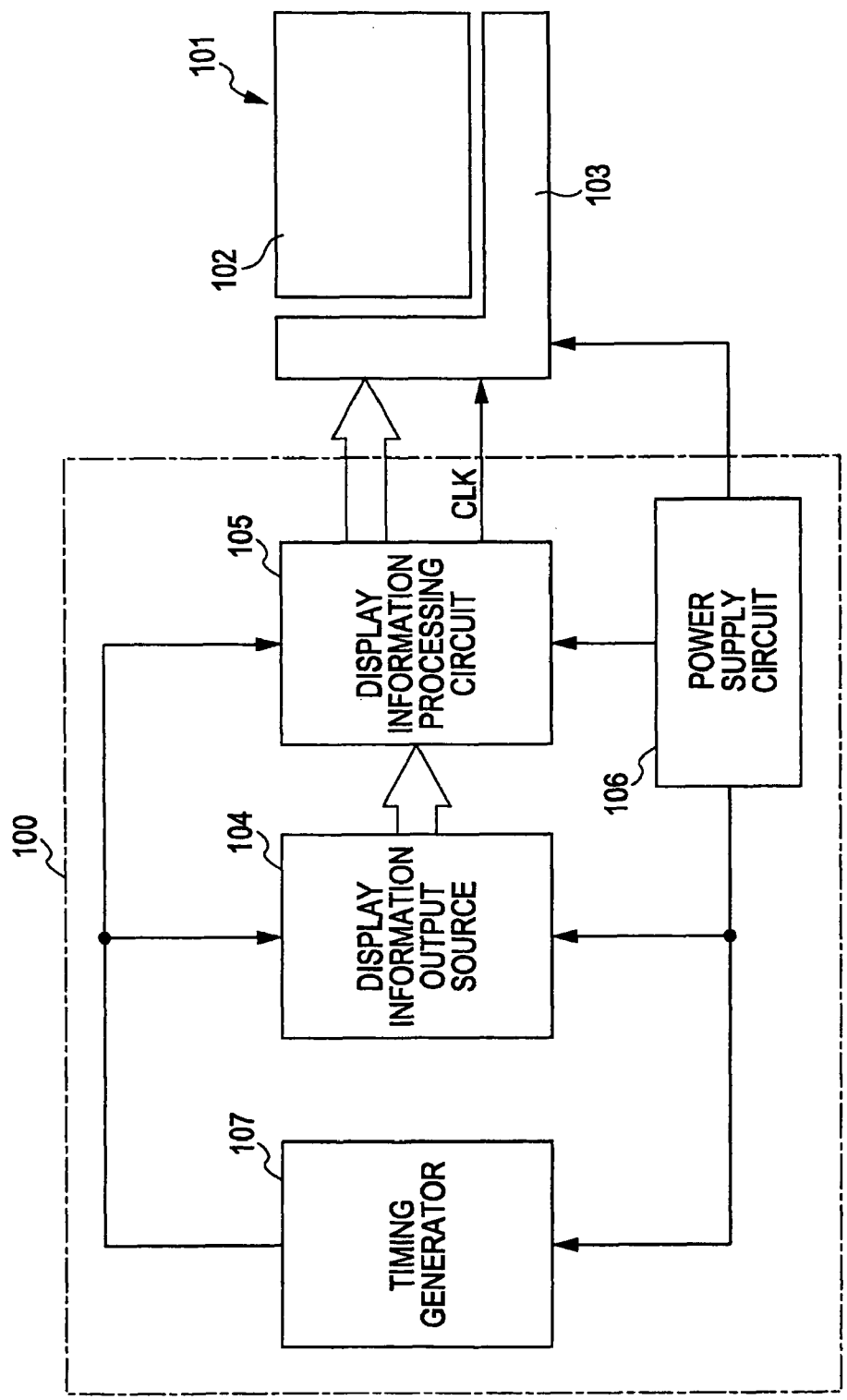
FIG. 17 is a block diagram illustrating an electronic apparatus according to still another embodiment of the invention.

FIG. 17 is an electronic apparatus according to an embodiment of the invention. The electronic apparatus shown in FIG. 17 includes a liquid crystal display device 101 and a control circuit 100 that controls the liquid crystal display device 101. The control circuit 100 includes a display information output source 104, a display information processing circuit 105, a power supply circuit 106, and a timing generator 107. In addition, the liquid crystal display device 101 includes a liquid crystal panel 102 and a driving circuit 103.

The display information output source 104 includes a memory such as a RAM (random access memory), a storage unit such as various disks, a tuning circuit that tunes and outputs a digital image signal. The display information output source 104 supplies display information, such as an image signal having a predetermined format, to the display information processing circuit 105 on the basis of various clock signals generated by the timing generator 107.

In addition, the display information processing circuit 105 includes a plurality of known circuits, such as amplifying and inverting circuits, a rotation circuit, a gamma correction circuit, or a clamping circuit. The display information processing circuit 105 performs a process on input display information and then supplies an image signal to the driving circuit 103 together with a clock signal CLK. Here, the driving circuit 103 generally refers to a test circuit or the like as well as a scanning line driving circuit or a data line driving circuit. Further, the power supply circuit 106 supplies predetermined a power supply voltage to the respective components.

The liquid crystal display device 101 can be formed by using the liquid crystal display device 1 shown in FIG. 2 or the liquid crystal display 51 shown in FIG. 7. In the liquid crystal display device 1 shown in FIG. 2, since the alignment layer 23b can be uniformly formed between the effective display region Vi and the peripheral region Vc by providing the recessed portions 49, to which the material of the alignment layer 23b flows, within the peripheral region Vc, it is possible to prevent the display brightness from becoming non-uniform. In addition, in the liquid crystal display device 51 shown in FIG. 7, since the alignment layer 23a can be uniformly formed between the effective display region Vi and the peripheral region Vc by providing the recessed portions 99, to which the material of the alignment layer 23a flows, within the peripheral region Vc, it is possible to prevent the display brightness from becoming non-uniform. Accordingly, even in the electronic apparatus using the liquid crystal display device 1 or the liquid crystal display device 51, it is possible to prevent the display brightness from becoming non-uniform.

Figure 18:
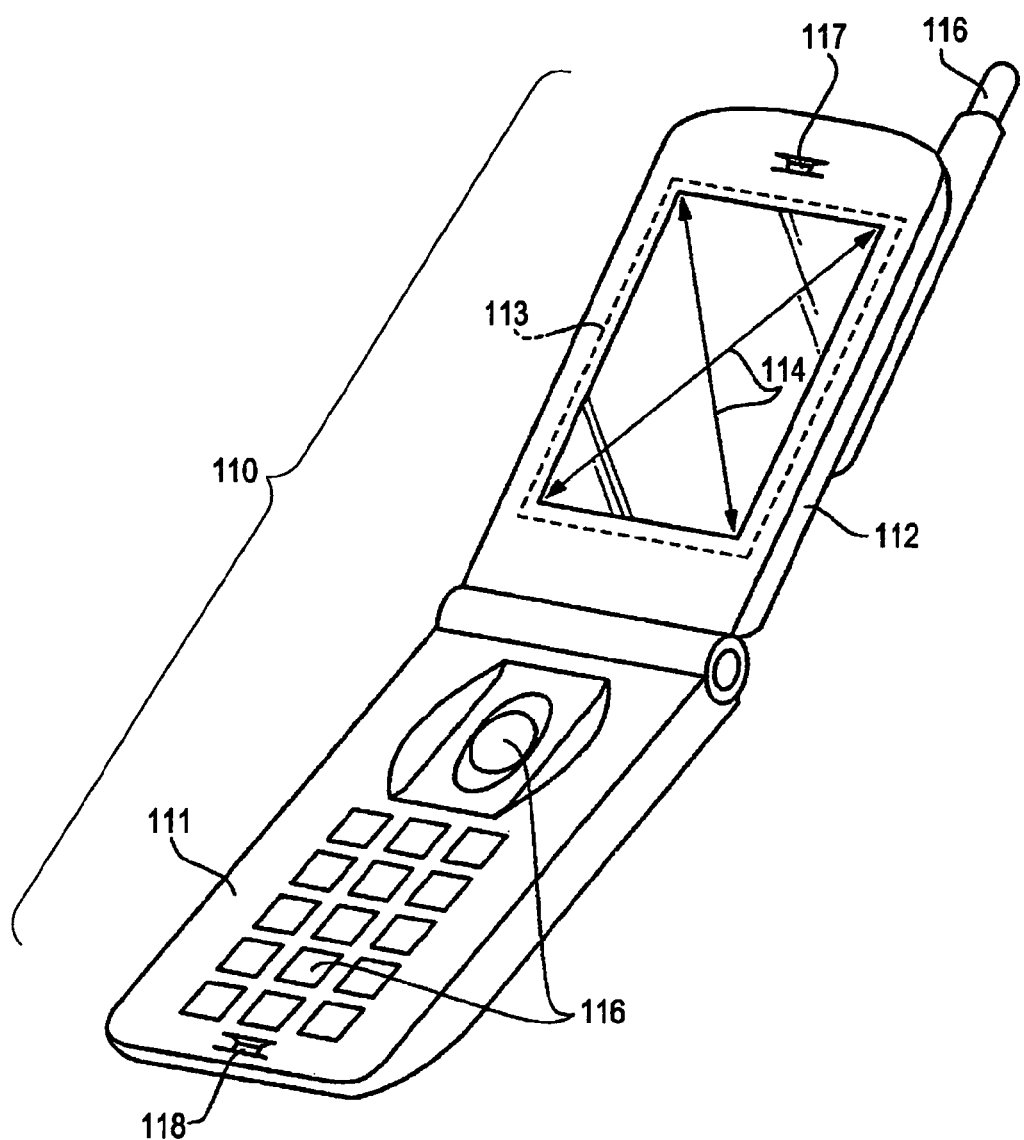
FIG. 18 is a perspective view illustrating an electronic apparatus according to still another embodiment of the invention.

FIG. 18 is a view illustrating a mobile phone, which is an example of an electronic apparatus according to another embodiment of the invention. A mobile phone 110 shown in FIG. 18 includes a main body unit 111 and a display unit 112 which can be folded. In addition, a display device 113 formed by an electro-optical device, such as a liquid crystal display device, is disposed inside the display unit 112, and various displays regarding phone communications can be viewed on a display screen 114 of the display unit 112. Further, operation buttons 116 are disposed in the main body unit 111.

On one end of the display unit 112, an antenna 116 which is extensible is attached. A speaker (not shown) is provided inside an earpiece 117 provided in an upper part of the display unit 112. In addition, a microphone (not shown) is provided inside a mouse piece 118 provided in a lower part of the main body unit 111. In addition, a control unit that controls an operation of the display device 113 is a part of a control unit that controls the entire control of the mobile phone, or the control unit that controls the operation of the display device 113 is provided inside the main body unit 111 or the display unit 112 apart from the control unit that controls the entire control of the mobile phone.

The display device 113 can be formed by using the liquid crystal display device 1 shown in FIG. 1 or the liquid crystal display device 51 shown in FIG. 7. In the liquid crystal display device 1 shown in FIG. 2, since the alignment layer 23b can be uniformly formed between the effective display region Vi and the peripheral region Vc by providing the recessed portions 49, to which the material of the alignment layer 23b flows, within the peripheral region Vc, it is possible to prevent the display brightness from becoming non-uniform. In addition, in the liquid crystal display device 51 shown in FIG. 7, since the alignment layer 23a can be uniformly formed between the effective display region Vi and the peripheral region Vc by providing the recessed portions 99, to which the material of the alignment layer 23a flows, within the peripheral region Vc, it is possible to prevent the display brightness from becoming non-uniform. Accordingly, even in the electronic apparatus using the liquid crystal display device 1 or the liquid crystal display device 51, it is possible to prevent the display brightness from becoming non-uniform.

MODIFICATIONS

Furthermore, an electronic apparatus may include a personal computer, a liquid crystal television, a view finder type or monitor direct view type video tape recorder, a car navigation apparatus, a pager, an electronic diary, a desktop calculator, a word processor, a workstation, a video phone, a POS terminal and the like, as well as the mobile phone described above.

The entire disclosure of Japanese Patent Application Nos: 2005-181542, filed Jun. 22, 2005 and 2006-090367, filed Mar. 29, 2006 are expressly incorporated by reference herein.

The entire disclosure of Japanese Patent Application Nos: 2005-181542, filed Jun. 22, 2005 and 2006-090367, filed Mar. 29, 2006 are expressly incorporated by reference herein.

What is claimed is:

1. An electro-optical device comprising:
a sealant provided between a pair of substrates in a frame shape;
an electro-optical material layer formed by sealing an electro-optical material within a region surrounded by the sealant;
an insulating layer provided within the region surrounded by the sealant on at least one of the pair of substrates; and
an alignment layer provided between the insulating layer and the electro-optical material layer,
the region surrounded by the sealant including an effective display region where display is performed and a peripheral region located between the effective display region and the sealant,
the insulating layer in the effective display region having a part adjacent to the peripheral region,
the insulating layer in the effective display region being thinner than that in the peripheral region, and
the insulating layer within the peripheral region is formed with a recessed portion to which a material of the alignment layer flows,
wherein the effective display region includes a reflective display region where reflective display is performed and a transmissive display region where transmissive display is performed,
the insulating layer within the effective display region is formed at least in the reflective display region so as to make the thickness of the electro-optical material layer in the reflective display region smaller than the thickness of the electro-optical material layer in the transmissive display region, and
the insulating layer within the reflective display region is formed to have the same thickness as the insulating layer within the peripheral region.

2. The electro-optical device according to claim 1, wherein the recessed portion is a groove extending along the effective display region.

3. The electro-optical device according to claim 1, wherein the recessed portion is a circular groove surrounding the effective display region.

4. The electro-optical device according to claim 1, wherein the height of the insulating layer located between the transmissive display region adjacent to the peripheral region and the recessed portion is smaller than the height of the insulating layer located between the reflective display region and the recessed portion.

5. The electro-optical device according to claim 1, wherein spacer members are respectively provided in both the reflective display region and the peripheral region where the recessed portion is not formed.

6. An electronic apparatus comprising the electro-optical device according to claim 1.

7. An electro-optical device comprising:
a sealant provided between a pair of substrates in a frame shape;
an electro-optical material layer formed by sealing an electro-optical material within a region surrounded by the sealant;
an insulating layer provided within the region surrounded by the sealant on at least one of the pair of substrates; and
an alignment layer provided between the insulating layer and the electro-optical material layer,
the region surrounded by the sealant including an effective display region where display is performed and a peripheral region located between the effective display region and the sealant,
the insulating layer in the effective display region having a part adjacent to the peripheral region,
the insulating layer in the effective display region being thinner than that in the peripheral region, and
the insulating layer within the peripheral region is formed with a recessed portion to which a material of the alignment layer flows,
wherein the effective display region includes a reflective display region where reflective display is performed and a transmissive display region where transmissive display is performed,
the insulating layer within the effective display region is formed at least in the reflective display region so as to make the thickness of the electro-optical material layer in the reflective display region smaller than the thickness of the electro-optical material layer in the transmissive display region, and
the insulating layer in the peripheral region having a part adjacent to the reflective display region, the insulating layer in the part being thicker than that in the recessed portion.

* * * * *